United States Patent [19]
Ouchi

[11] Patent Number: 6,127,819
[45] Date of Patent: Oct. 3, 2000

[54] ROLLING BEARING UNIT WITH ROTATIONAL SPEED SENSOR

[75] Inventor: Hideo Ouchi, Fujisawa, Japan

[73] Assignee: NSK Ltd., Tokyo, Japan

[21] Appl. No.: 09/173,780

[22] Filed: Oct. 16, 1998

[30] Foreign Application Priority Data

| Oct. 17, 1997 | [JP] | Japan | 9-285195 |
| Nov. 10, 1997 | [JP] | Japan | 9-307254 |
| Jan. 7, 1998 | [JP] | Japan | 10-001549 |
| Jul. 1, 1998 | [JP] | Japan | 10-186239 |

[51] Int. Cl.[7] .......................... G01P 3/481; F16C 41/04
[52] U.S. Cl. .................................. 324/173; 384/448
[58] Field of Search .................................. 324/166, 173, 324/174, 207.2, 207.21, 207.22, 207.25, 262; 188/181 R; 384/446, 448, 449

[56] References Cited

U.S. PATENT DOCUMENTS 5,148,104  9/1992  Ishikawa .................................. 324/173
5,640,087  6/1997  Alff ........................................... 324/173

FOREIGN PATENT DOCUMENTS

| 0 675 364 A2 | 10/1995 | European Pat. Off. |
| 44 10 843 A1 | 10/1995 | Germany. |
| 44 10 861 A1 | 10/1995 | Germany. |
| 1-276070 | 11/1989 | Japan. |
| 5-10010 | 2/1993 | Japan. |
| 7-31539 | 6/1995 | Japan. |

*Primary Examiner*—Jay Patidar
*Attorney, Agent, or Firm*—Evenson, McKeown, Edwards Lenahan, P.L.L.C.

[57] ABSTRACT

A sensor built-in bearing is provided wherein the sensor is removably connected to the cover through a threadable fixing portion and no foreign matter from outside enters the interior of the cover through the threadable fixing portion.

6 Claims, 14 Drawing Sheets

ROLLING BEARING UNIT WITH ROTATIONAL SPEED SENSOR

BACKGROUND OF THE INVENTION

The present invention relates to a rolling bearing unit with a rotational speed sensor which is used to rotatably support an automobile wheel to a suspension while detecting the rotational speed of the automobile wheel.

The rotational speed of the automobile wheel must be detected to control the antilock brake system (ABS) and traction control system (TCS).

FIGS. 1 and 2 show an example of the conventional structures of the rolling bearing unit with the rotational speed sensor, disclosed in JP Utility Model Publication JITSUKAI HEI NO. 7-31539 for such a purpose.

The rolling bearing unit with the rotational speed sensor has a stationary ring or outer ring 1 which does not rotate during use, and a rotating ring comprises a hub 2 which is rotatable during use and rotatably supported on the inner diameter side of the outer ring 1. An encoder 3 is fixed to part of the hub 2, and a sensor 4 is supported by the outer ring 1 to detect the rotational speed of the encoder 3.

Specifically, the outer ring 1 has an inner peripheral surface formed with outer ring raceways 5 in double rows. The rotating ring comprises, in addition to the hub 2, an inner ring 7 which is fitted onto the hub 2 and securely fixed to the hub 2 with a nut 6. The hub 2 and inner ring 7 have an outer peripheral surface formed with inner ring raceways 8. A plurality of rolling members 9 are rotatably provided between the outer ring raceways 5 and the inner ring raceways 8 and supported by cages 10, thereby rotatably supporting the hub 2 and inner ring 7 in the outer ring 1.

The hub 2 has an axially outer end portion which projects axially outward from the axially outer end of the outer ring 1 and has a flange 11 for mounting the automobile wheel thereto. The outer ring 1 has an axially inner end portion which is formed with a mount portion 12 for mounting the outer ring 1 to the suspension.

The term "axially outer" means the widthwise outside in the state of installation into the automobile, right in FIG. 1, and the term "axially inner" means the widthwise central side in the state of installation into the automobile, left in FIG. 1.

The gap between the opening portion at the axially outer end of the outer ring 1 and the outer peripheral surface at the middle portion of the hub 2 is closed off by a seal ring 13.

In the case of the rolling bearing unit for heavy automobiles, tapered rollers can be used instead of the balls illustrated for the rolling members 9.

The encoder 3 is fitted onto the outer peripheral surface of the inner ring 7 at an axially inner end portion separated from the inner ring raceway 8 to assemble the rotational speed sensor in the rolling bearing unit.

The encoder 3 is made of a magnetic metal plate such as carbon steel and formed generally in an annular shape with a L-shaped cross section by way of a plastic working process to comprise a cylindrical portion 15 and a circular ring portion 16. The cylindrical portion 15 is fitted and fixed to the axially inner end portion of the inner ring 7 with interference fit.

A number of through holes 17 are formed in the circular ring portion 16 to extend radially in a slit shape, and each being long in the diametrical direction of the circular ring portion 16, and arranged with a uniform interval in the circumferential direction, so that the magnetic characteristics of the circular ring portion 16 are changed circumferentially alternately with a uniform interval.

Fittingly fixed to the opening portion at the axially inner end of the outer ring 1 is a cover 18 which faces the axially inner surface of the circular ring portion of the encoder 3 to close off the opening at the axially inner end of the outer ring 1. The cover 18 is formed with a metal plate through a plastic working process and comprises a cylindrical fitting portion 19 fittingly fixed to the opening portion at the axially inner end of the outer ring 1 and a shield plate portion 20 to close off this opening. The shield plate portion 20 has a central portion formed with a bulge portion 21 in a bottomed cylindrical shape to prevent any interference between the shield plate portion 20 and the nut 6, and an outer peripheral portion formed with a through hole 22 located radially outward than the bulge portion 21 through which the detecting portion 24 of the sensor 4 is inserted into the inside of the cover 18.

A mount flange 25 is fixed to the outer peripheral surface at the middle portion of the sensor 4, and by fixing the flange 25 to the shield plate portion 20 of the cover 18 with stop screws 26, the sensor 4 is securely connected to the cover 18 in a predetermined position relation. In the state where the sensor 4 is fixed to the cover 18, the tip end of the detecting portion 24 faces the axially inner surface of the circular ring portion 16 through a minute clearance.

During use of the rolling bearing unit with rotational speed sensor as mentioned above, the mount portion 12 provided on the outer peripheral surface of the outer ring 1 is fixedly connected to the suspension with bolts (not shown), and the vehicle wheel is fixed to the flange 11 formed on the outer peripheral surface of the hub 2 with the studs 27 through the flange 11, thereby rotatably supporting the vehicle wheel to the suspension.

As the vehicle wheel rotates in this state, the through holes 17 in the circular ring portion 16 and the column portions between the circumferentially adjacent through holes 17 alternately pass by the end faces of the detecting portions 24 of the sensor 4. As a result, the density of magnetic flux through the sensor 4 changes and the output of the sensor 4 changes. The frequency at which the output of the sensor 4 changes, is proportional to the rotational speed of the vehicle wheel. Accordingly, the output of the sensor 4 is sent to the control devices (not shown), so as to control the ABS and TCS.

In the case of the conventional structures as shown in FIGS. 1 and 2, the sensor 4 is securely connected to the cover 18 with the screws 26 to reduce the man power for repair and replacement of the sensor. Specifically, bolts 28 are inserted into the through hole 54 in the mount flange 25 and into the through hole 56 in the cover 18 with the sensor 4 secured thereto, and the nuts 29 are threaded and tightened to the bolts 28, so that the sensor 4 is fixedly connected to the cover 18. When removing the sensor 4 from the cover 18, the nuts 29 are loosened and the sensor 4 is disengaged from the cover 18.

In the conventional structures of FIGS. 1 and 2, where the through holes 54, 56 are provided to be inserted by the bolts 28, any foreign matter such as dirty water may enter the space 30, where the rolling members 9 exist, from outside through the minute clearance around the bolts 28 inserted into the through holes 54, 56, which may result in that any corrosion and abrasion may be caused in the rolling members 9 and in the outer and inner ring raceways 5, 8, worsening the durability of the rolling bearing unit. In addition, the foreign matter such as magnetic powders adhere to the sensor 4 and encoder 16 to worsen the precision in detecting the rotational speed.

In addition, in the conventional structure, the operation to securely connect the sensor 4 to the cover 18 with screws is inconvenient and troublesome. Specifically, when the sensor 4 is fixed to the cover 18, the nuts 29 are threaded to the bolts 28 inserted to the through hole 54 in the mount flange 25 and to the through hole 56 in the cover 18, and then the bolts 28 and nuts 29 are tightened using a pair of tools such as spanner or wrench from the opposite sides of the cover 18.

Particularly, when installing the sensor 4 after the cover 18 is connected to the outer ring 1, the heads of the bolts 28 existing in the cover 28 could not be retained, and the process for clamping the bolts 28 and the nuts 29 must be done while the cover 18 is removed from the outer ring 1. Such a process to incorporate the sensor 4 is troublesome and inconvenient, which may cause the cost of the rolling bearing unit increased.

SUMMARY OF THE INVENTION

An object of the present invention is to provide a rolling bearing unit with a rotational speed sensor wherein the sensor is mounted to the cover with screws to reduce the manpower for repair and replacement of the sensor while using no seal member in the screw connecting structure to reduce the cost and improving the installation of the sensor.

Another object of the present invention is to provide a sensor built-in bearing having a cover to which a sensor is threadably connected, wherein the sensor can be replaced without removing the cover from the outer ring of the bearing, and no foreign matter enters the interior of the cover through the threadable fixing portion.

DETAILED DESCRIPTION OF THE PREFERRED EMBODIMENTS

Figure 1:
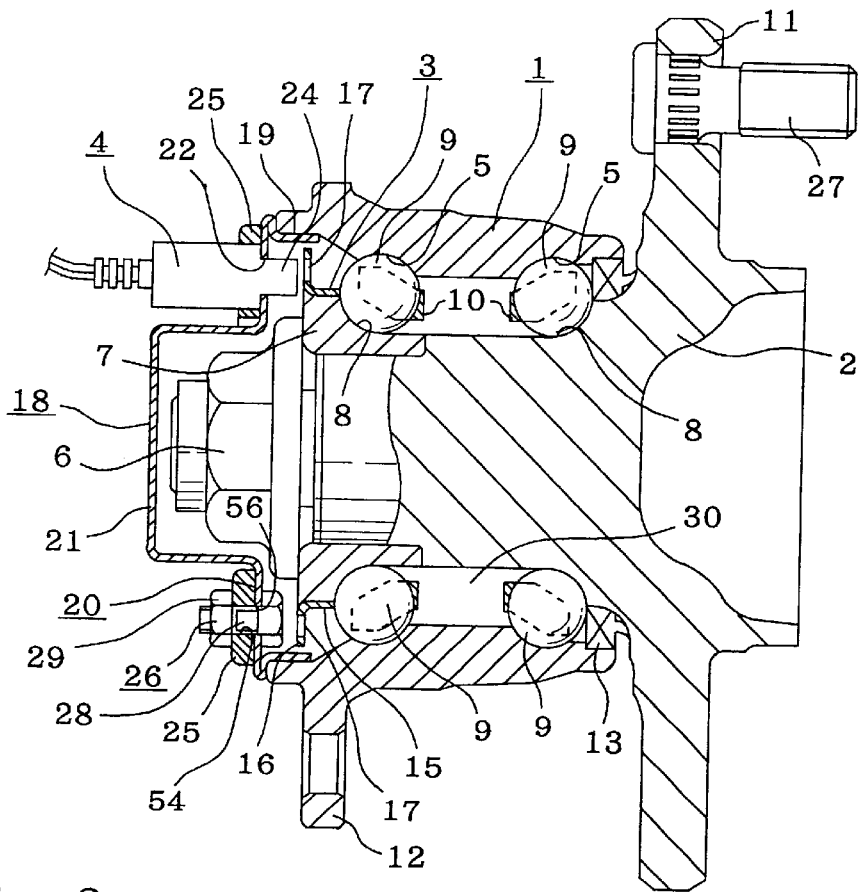
FIG. 1 is a cross sectional view of an example of the conventional structures, taken along the line I-O-I of FIG. 2.

The present invention provides an inexpensive seal structure to prevent any foreign matter from entering the interior through the threadable fixing portion, and specifically, a structure having a threadable fixing portion of the sensor to the cover without piercing the cover and a structure provided with a seal member for preventing the foreign matter from entering the interior of the cover which is pierced.

In the latter structure, the seal member is easily mounted to the cover, and no excessive compression load is applied to the seal member even if a screw is tightened for connecting the sensor holder to the cover, whereby the seal performance is secured for a long time.

In the present invention, structures with a nut or bolt welded to the cover are also shown in examples, where there is no need of seal performance in the welded portion, and the welding operation is easy. It should be noted that JP JIT-SUKAI HEI No. 7-31539 discloses a structure of a thin cover which is pierced and then provided with a bolt by welding, but it is not clear whether the welded portion is formed in a sealed structure. It is difficult to weld the bolt to the cover of thin plate, avoiding deformation of the cover, to secure the seal performance at the welded portion.

The rolling bearing unit with rotational speed sensor in a feature of the present invention comprises, like the conventional rolling bearing unit as mentioned above, a stationary ring which has a stationary peripheral surface formed with stationary raceways and does not rotate during use, a rotating ring which has a rotating peripheral surface facing the stationary peripheral surface and formed with rotating raceways and rotates during use, a plurality of rolling members rotatably provided between the stationary raceways and the rotating raceways, an encoder fixed to part of the rotating ring, concentric with the rotating ring, such that the circumferential characteristics change alternately with a uniform interval, a cover fixed to part of the stationary ring, facing the encoder, and formed with an insert hole facing the encoder, and a sensor inserted into the insert hole to be fixedly supported by the cover to change the output corresponding to the rotation of the encoder.

Particularly, in the rolling bearing unit with rotational speed sensor of the present invention as shown in FIG. 3 to FIG. 10, the sensor is supported by the holder, which has an insert portion to be inserted into the insert hole to support the sensor, and a mount flange portion having a base end portion connected to the end portion of the insert portion and formed with a through hole at the tip end portion of the mount flange portion.

The portion of the cover facing the through hole when the insert portion is inserted into the insert hole is formed with a nutlike or boltlike portion which is formed in the state where they do not pass throughout the cover. The holder is fixedly connected to the cover based on the threaded engagement between the bolt inserted into the through hole and the nutlike portion or between the nut and the boltlike portion inserted into the through hole.

The operation of the rolling bearing unit with rotational speed sensor of the present invention, to rotatably support the vehicle wheel to the suspension of the automobile and to detect the rotational speed of the vehicle wheel is similar to that of the conventional structure.

Particularly, in the rolling bearing unit with rotational speed sensor of the present invention, the sensor is mounted to the cover with screws to reduce the manpower for repair and replacement of the sensor while realizing the seal performance at lower cost at the screw connecting portion, and improving the installation of the sensor to the cover.

Specifically, when the sensor is connected to the cover with screws, the insert portion of the holder supporting the sensor is inserted into the insert hole of the cover, and one face of the holder is abutted to one face of the cover in the state where the nutlike portion or bolt like portion in the cover is placed in alignment with the through hole of the mount flange portion of the holder.

Then, the threaded engagement is made between the bolt inserted into the through hole and the nutlike portion or between the nut and the boltlike portion inserted into the through hole, which is tightened to securely connect the sensor to the cover. The nutlike portion and boltlike portion are provided so as not to pass throughout the cover. Accordingly, no foreign matter such as dirty water is prevented from entering through the screw connecting portions the space where the rolling members are located. As a result, there is no need of providing the portion for screw-connecting the sensor to the cover with the seal member, thus decreasing the whole cost of the rolling bearing unit with rotational speed sensor.

The operation of connecting the sensor to the cover is simply made by tightening the bolt or nut in the threadable engagement with the nutlike portion or boltlike portion. This operation is carried out with the cover mounted to the stationary ring, so that there is no need of removing the cover from the stationary ring when installing the sensor to the cover.

Accordingly, with the rolling bearing unit with rotational speed sensor of this invention, the manpower in the operation of securely connecting the sensor to the cover is decreased, and the operation for assembling the rolling bearing unit with rotational speed sensor is improved, which leads to the cost reduction of the whole unit.

In another feature of the present invention as shown in FIG. 3 to FIG. 7, the sensor is supported by part of the cover with the detecting portion facing part of the encoder to change the output signal corresponding to the characteristics of the encoder. The sensor is supported by a holder which has a mount flange formed with a through-hole. The holder is securely connected to the cover based on the threaded engagement with the bolt inserted into the through-hole and the nut.

The cover is provided with a bottomed recess portion at a location in alignment with the through-hole, and the head of the bolt or the nut is fixed to the recess portion by way of welding or adhesive.

When connecting the sensor to the cover, the bolt or nut fixed to the bottomed recess portion in the cover is provided in alignment with the through-hole in the mount flange of the holder for the sensor, and in this state, one face of the mount flange is mated with one face of the cover. The sensor is fixed to the cover by tightening the threaded engagement between the bolt and the nut.

Since the recess portion provided with the bottom does not pass throughout the cover, the foreign matter such as dirty water does not enter through the bolt engagement portion from outside to the space where the rolling members exist.

Figure 8:
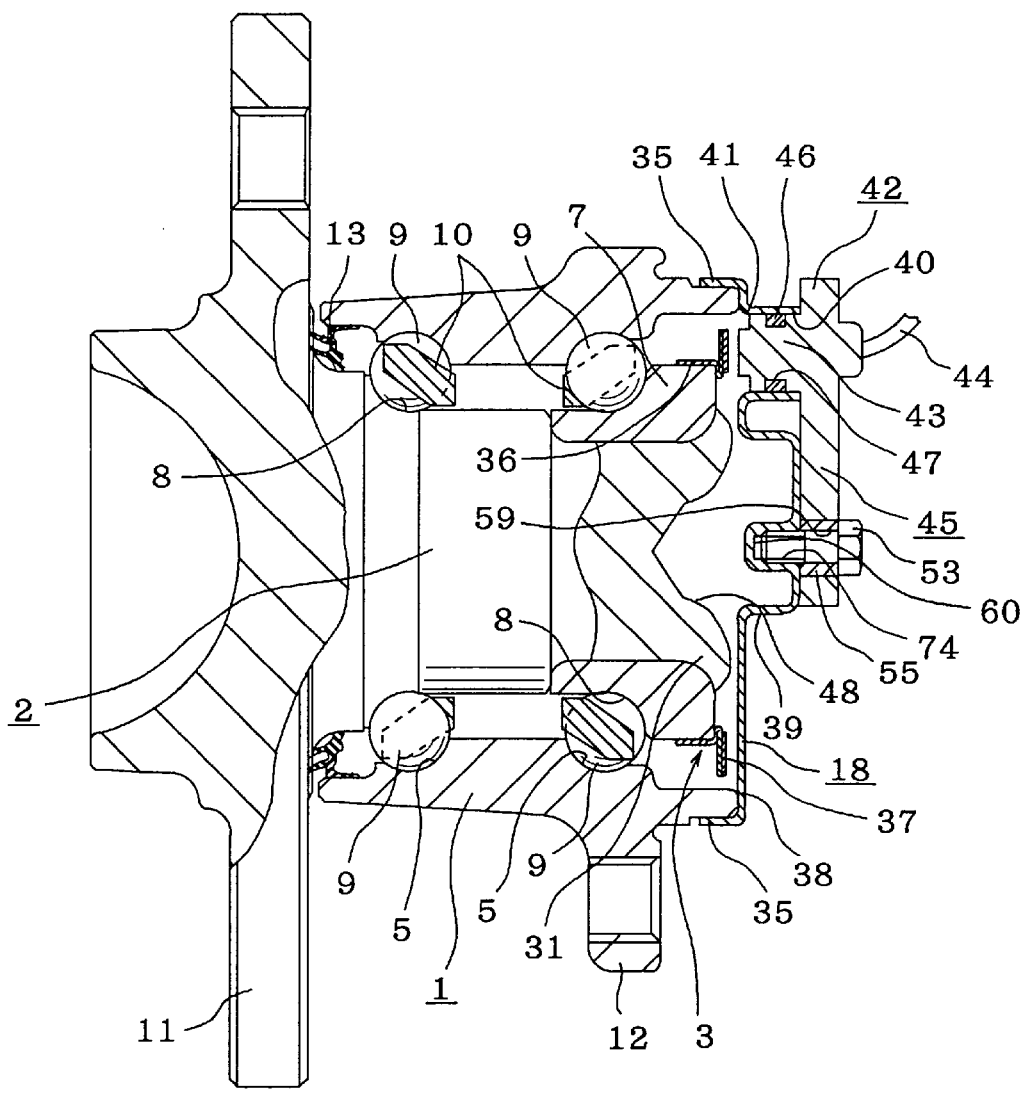
FIG. 8 is a cross sectional view of a third example of the embodiments of the present invention.
Figure 9:
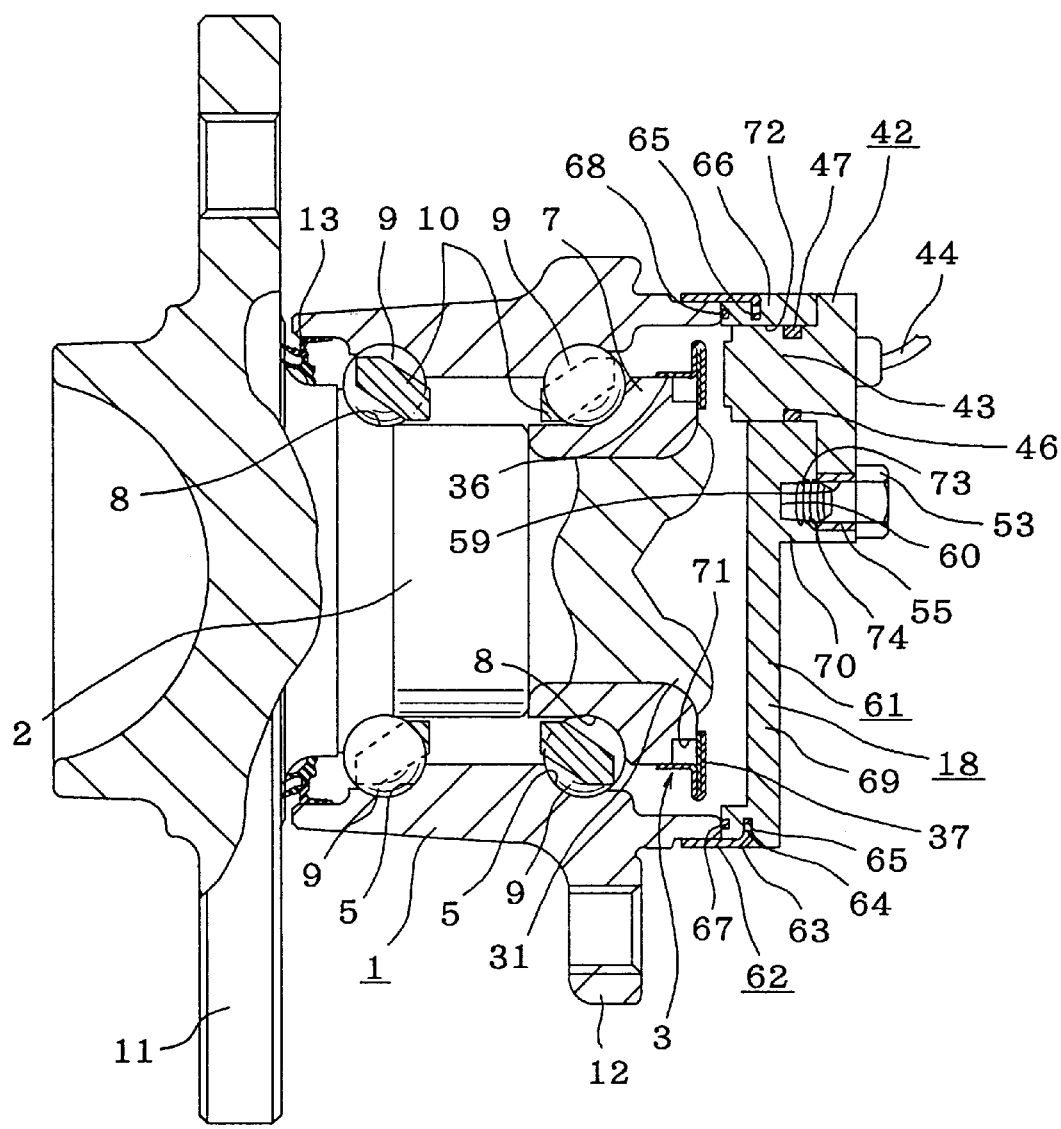
FIG. 9 is a cross sectional view of a fourth example of the embodiments of the present invention.

Another feature of the present invention as shown in FIGS. 8 and 9 is to provide a structure of the cover with no hole pierced and with a female thread portion formed. Although, in the conventional structure, the cover is made from a thin plate and therefore it is difficult to provide the cover with a sufficiently long thread portion, the present invention has a cover structure having a lightweight and sufficiently long thread portion.

Since the cover is not pierced in the threadable fixing portion between the sensor holder and the cover, no dirty water enters the interior of the cover through the threaded portion. The sensor can be replaced without removing the cover from the outer ring of the bearing.

In another feature of the present invention as shown in FIG. 11 to FIG. 14, the cover is provided with a cylindrical portion for communication between the outside and inside of the cover at a portion adjacent the through-hole, and a female thread is formed on the inner peripheral surface of the cylindrical portion.

The holder for the sensor comprises a main body having an insert portion inserted into the through-hole and a flange portion provided on the main body. With the insert portion inserted into the through-hole, the screw inserted into the second through-hole in the flange portion is threaded with the female thread for tightening so as to fix the sensor to the cover. A seal member is provided to prevent the foreign matter on the outside of the cover from entering the interior of the cover through the portion where the main body is inserted into the through-hole and through the portion where the screw is inserted into the cylindrical portion, when tightening the screw, there is no need of a rotation stop means. The tightening and loosening of the screw can be done with the cover mounted to the stationary ring. There is no need of removing the cover from the stationary ring when assembly the sensor to the cover.

Since the foreign matter is prevented from entering the interior of the cover from outside, the corrosion of the encoder in the cover and the deterioration of grease in the rolling member portion will not occur.

In another feature of the present invention as shown in FIG. 15 to FIG. 18, the rolling bearing unit with rotational speed sensor comprises an outer-ring-like member which is not rotated during use and provided with an inner peripheral surface formed with outer ring raceways, an inner-ring-like member which is rotated during use and provided with an outer peripheral surface formed with inner ring raceways, a plurality of rolling members between the outer and inner ring raceways, a cover mounted to the outer-ring-like member on the opening portion at one end, an encoder provided in part of the inner-ring-like member to face the cover in concentric with the inner-ring-like member so as to have the circumferential characteristics changing alternately with a uniform interval, the cover being formed with a through-hole at a location facing the encoder, and a sensor fixedly supported by a portion of the cover, and inserted into the through-hole to change its output as the encoder rotates.

The cover has a plate portion of synthetic resin at least at a portion where the through-hole is provided. A second hole is formed in a portion of the plate portions separated from the first through-hole in parallel with the first through-hole. The plate portion has one side facing the encoder, where a recess portion having an inner peripheral surface formed in a non-cylindrical shape is formed around the opening on the one end side of the second through-hole.

The holder has an insert portion inserted into the through-hole when supporting the sensor, a mount flange portion having a base end portion connected to the end of the insert portion, the mount flange portion having a tip end portion formed with a third through-hole, at a location in alignment with the opening portion on the other end side of the second through-hole when the insert portion is inserted into the first through-hole. When the insert portion is inserted into the first through-hole, the holder is securely fixed to the cover by tightening the bolt in the second and third through-holes in the threaded engagement with the nut. The head of the bolt or the nut is prevented from being rotated based on the engagement between the outer peripheral surface and the inner peripheral surface of the recess portion. A seal ring is provided in the anchoring groove in a closed annular shape in the inside surface of the recess portion or on the inner peripheral surface of the second through-hole so as to come into resilient contact with part of the bolt generally circumferentially to provide a sealing between the bolt and the plate portions. In operation to fixedly connect the sensor to the cover with screws, the insert portion of the holder for the sensor is inserted into the through-hole in the plate portion of synthetic resin in the cover is placed in alignment with the third through-hole in the mount flange of the holder, and in this state, the one end face of the holder is abutted to the one end face of the cover. Then, the bolt and nut are tightened to fix the sensor to the cover as mentioned above.

Since the seal ring is fitted into the anchoring groove, no large compression force is applied to the seal ring upon tightening the head of bolt with respect to the mating surface. Accordingly, the durability of the seal ring and the seal performance at the threaded engagement portion for a long time can be secured. The whole rolling bearing unit becomes lightweight because at least part of the cover is made of synthetic resin.

Now, the present invention is further detailed referring to the attached drawings.

Figure 3:
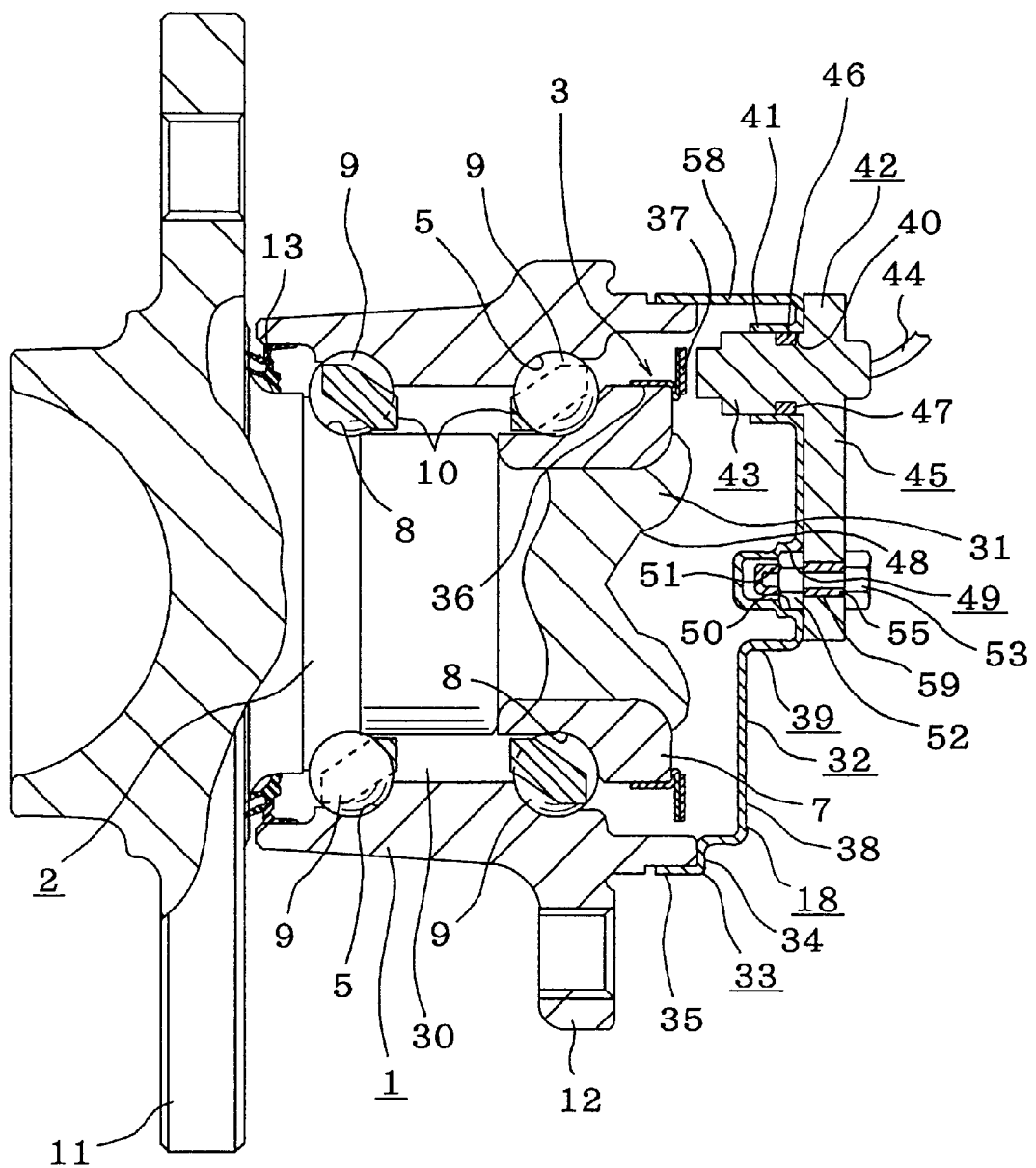
FIG. 3 is a cross sectional view of a first example of the embodiments of the present invention.
Figure 4:
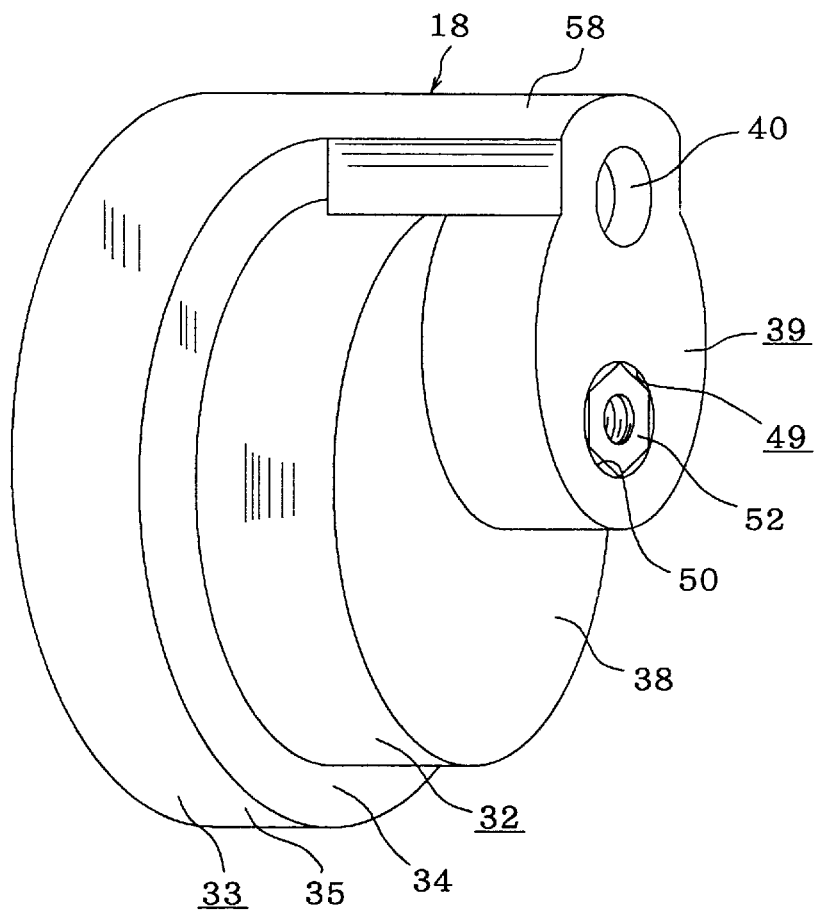
FIG. 4 is a perspective view of the cover of FIG. 3.
Figure 5:
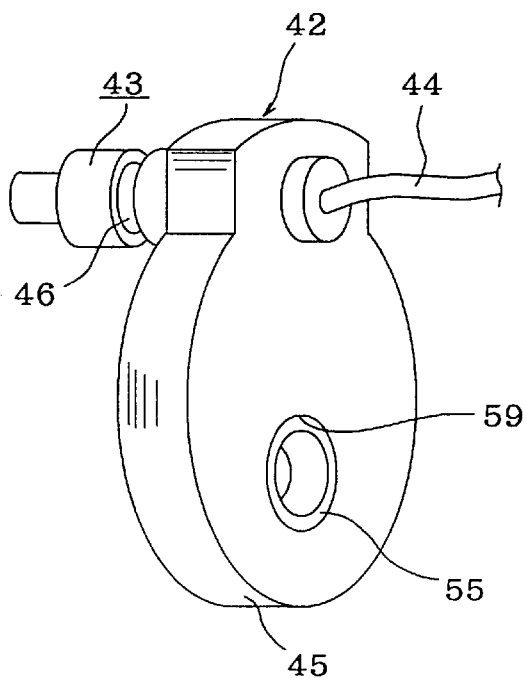
FIG. 5 is a perspective view of the end portion of the harness and the sensor unit.

FIGS. 3 to 5 illustrate a first example of the embodiments of the present invention. The present invention is characterized by the structure to connect the sensor unit comprising a holder and a sensor supported in the holder, to the cover fixed to the stationary ring or outer-ring-like member of the rolling bearing unit.

Figure 2:
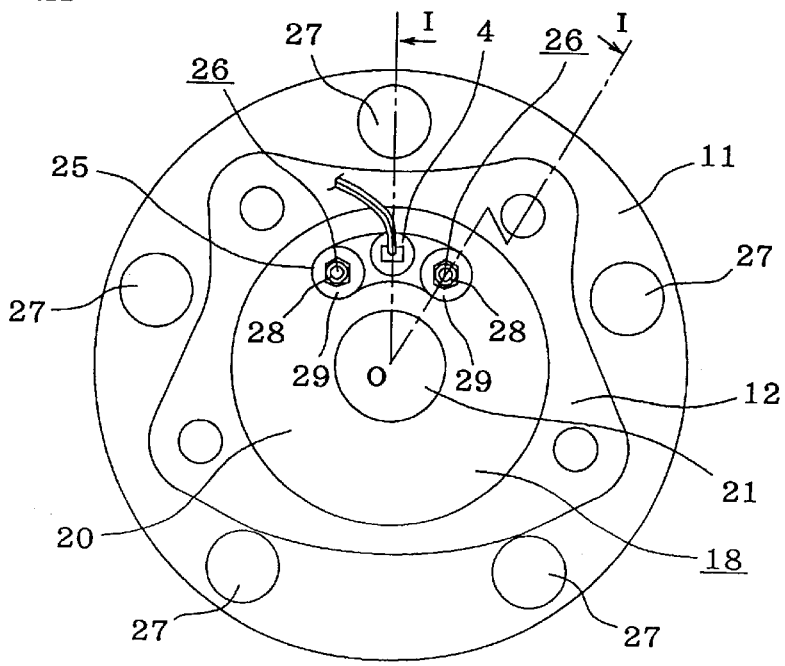
FIG. 2 is a view from left of FIG. 1.

The structure and operation of the rolling bearing unit for rotatably supporting the rotating ring or inner-ring-like member to the stationary ring or outer-ring-like member are substantially the same to those of the conventional structure of FIGS. 1 and 2, so like reference numerals are attached to like members, and redundant explanation is omit or simplified, and the characteristic portions and different portions over the conventional structure are focused.

The figures showing the present example are reversed with reference to FIG. 1 for the conventional structure in the axially inner and outer directions with reference to the widthwise direction of the vehicle.

In the present example, different from the conventional structure as mentioned above, the nut 6 (FIG. 1) is not used for fixing the inner ring 7 to the hub 2, and instead, the tip end portion (the right end portion in FIG. 3) of the hub 2 is formed in the cylindrical portion 31, the tip end of which is projected from the axially inner end face of the inner ring 7 and crimped radially outward to securely fix the inner ring 7 to the hub 2.

With such a structure, there is no need of providing the nut 6, which reduces the cost, and the space can be effectively used because the nut 6 is omitted.

The outer ring or stationary ring 1 does not rotate during use, and has an axially inner end (right end in FIG. 3) formed with an opening portion to which a cover 18 is mounted to close the opening at the axially inner end of the outer ring 1.

The cover 18 is formed through plastic deformation such as press forming, deep drawing process etc. from a metal plate which has corrosion resistance, such as stainless steel, galvanized steel, chromium plated steel, and comprises a main portion 32 in a bottomed cylindrical shape, and a flange portion 33 having a L-shaped cross section and projecting from the open peripheral edge portion of the main portion 32 radially outward.

The flange portion 33 has an abutment portion 34 which can be abutted to the opening portion at the axially inner end of the outer ring 1, and a fitting portion 35 which can be fitted onto the opening portion of the outer ring 1.

The fitting portion 35 of the cover 18 is fitted onto the axially inner end of the outer ring 1 with interference fit to close off the opening of the axially inner end of the outer ring 1. The axially outer face, or opening end face, of the abutting portion 34 of the flange portion 33 is abutted to the axially inner end of the outer ring 1.

Fitted onto the axially inner end portion (right end portion in FIG. 3) of the inner ring 7 of the rotating ring is an encoder 3 which comprises a support ring 36 and a permanent magnet 37.

The support ring 36 is made of a magnetic metal plate such as SPCC and formed by a bending or drawing process in a generally annular shape with T-shaped cross section, and fitted onto the axially inner end of the inner ring 7 with interference fit. The permanent magnet 37 is made of a rubber with ferrite mixed therein and attached to the circular ring portion of the support ring 36, at the axially inside thereof, by seizure etc.

The permanent magnet 37 is magnetized in an axial direction (left and right direction in FIG. 3), and the polarity directions are changed alternately in the circumferential direction with a uniform interval. Specifically, the axially inner surface of the encoder 3 is circumferentially alternately provided with S-poles and N-poles with a uniform interval therebetween.

The encoder 3 is formed in a T-shaped cross section because the inner diameter of the permanent magnet 37 is made smaller than the shoulder portion of the inner ring 7 to increase the polarity area of the poles (N-poles or S-poles) of the permanent magnet 37. This will improve the detecting performance of the sensor with respect to the detected portion of the encoder 3.

The cover 18 has a main portion 32 the central portion of which is formed with a bottom plate portion 38. The outside surface (right side surface in FIGS. 3 and 4) of the bottom plate portion 38 on the side opposite to the space 30 where the rolling members 9 are located, is to be closed by the cover 18. An axially extending projection 39 is provided on a radially outer portion (upper portion in FIG. 3) of the outside surface of the bottom plate portion 38. The projection 39 has an outer wall portion part of which is projected radially outward than the outer peripheral surface of the bottom plate portion 38 to form a bulge portion 58 continued to the outer peripheral surface of the fitting portion 35 of the flange 33. Accordingly, at this portion, the abutment portion 34 of the flange portion 33 is discontinued. The portion of the projection 39 on the radially outward side of the bottom plate portion 38, facing the axially inner surface of the permanent magnet 37 of the encoder 3, is formed with an insert hole 40 formed by a burring process. A short cylindrical portion 41 is also formed by the burring process and projected on the side of facing the encoder 3. The burring process is conducted with a dies (not shown) abutted to the axially outer surface (left side surface in FIG. 3) of the projection 39 around the portion where the insert hole 40 is formed. Thus, by forming the short cylindrical portion 41, the insert portion 43 of the sensor unit 42 (described later) is inserted into the short cylindrical portion 41, which makes easy the process to temporarily fixing the sensor unit 42 to the cover 18.

The insert portion 43 which is provided at a portion closer to the tip end (left end in FIGS. 3 and 5) of the sensor unit 42 with the sensor supported in the holder, is inserted into the insert hole 40 without play. The detecting portion of the sensor is located on the tip end surface of the insert portion 43.

The sensor unit 42 has a sensor comprising a magnetism detecting element such as Hall element, magnetism resistance element (MR element) to change the characteristics corresponding to the directions of the magnetic flux, an IC including the wave shape circuit to shape the output wave of the magnetism detecting element, and a pole piece of a magnetic material to lead the magnetic flux from (or into) the permanent magnet 37 to the magnetism detecting element. Incidentally, the pole piece, used to collect magnetic fluxes, can be omitted. The sensor is embedded in the holder of synthetic resin to form the sensor unit 42. A harness 44 is provided to send the output signal in a shaped wave from the IC to a control device (not shown), and the end of the harness 44 is directly (not through the connector etc.) connected to the sensor unit 42. By omitting the connector, the cost of the rolling bearing unit is reduced.

An anchoring groove 46 is formed on the outer peripheral surface of the middle portion of the insert portion 43, and an O-ring 47 is anchored in the anchoring groove 46. In the state where the insert portion 43 is inserted into the insert hole 40 and the short cylindrical portion 41, the O-ring 47 is resiliently compressed between the inner peripheral surface of the short cylindrical portion 41 and the bottom surface of the anchoring groove 46 to provide a seal between the outer peripheral surface of the insert portion 43 and the inner peripheral surface of the insert hole 40. Specifically, the O-ring 47 prevents the foreign matter such as dirty water from penetrating through the insert hole 40 into the cover 18 and the outer ring 1. The durability of the rolling bearing unit is secured and the foreign matter such as magnetic powders is prevented from adhering to the side surface of the permanent magnet of the encoder 3, whereby the precision of the rotational speed detection is not worsened.

For the seal ring for sealing the insert portion 43 of the sensor unit 42 with respect to the cover 18, another ring such as X-ring with x-shaped cross section can be used instead of the O-ring 47, so that the force to insert the insert portion 43 of the sensor unit 42 into the insert hole 40 is reduced to make easy the installation process of the sensor unit 42.

Provided closer to the base end of the sensor unit (closer to the right end in FIGS. 3, 5) is a mount flange 45 which has its base portion connected to the base end portion of the insert portion 43 of the sensor unit 42. The mount flange 45 can be abutted to the end surface of the projection 39 of the cover 18. The abutment surfaces of the mount flange portion 45 and the projection 39 are made smooth.

On the portion closer to the radial center of the end surface of the projection 39 of the cover 18, facing the recessed portion 48 on the axially inner side of the cylindrical portion 31 of the hub 2, a bottomed stepped concave portion 49, not a through hole, is provided. This stepped concave portion 49 comprises a larger diameter portion 50 on the opening side and a smaller diameter portion 51 on the bottom side.

A nut 52 is fixed to the larger diameter portion 50 e.g. by way of welding or adhesion. When fixing it by welding, the nut 52 is inserted into the larger diameter portion 50, and then a pair of electrodes for welding are abutted to the nut 52 and the cover 18. Thus, the outer surface of the nut 52 is welded to the inner surface of the larger diameter portion 50 at the contact portions.

In this condition, the nut 52 never rotates or axially moves in the stepped concave portion 49. The larger diameter portion 50 has a depth such that, in the state where the nut 52 is fixed by welding or adhesion, the nut 52 is retained not to project from the end face of the projection 39.

The smaller diameter portion 51 has a size to receive the tip end of the threaded portion of the bolt 53 (detailed later) threaded with the nut 52 fixed by welding in the larger diameter portion 50.

On the other hand, the tip end (lower end portion in FIGS. 3 and 5) of the mount flange portion 45 of the sensor unit 42 facing the stepped concave portion 49 of the cover 18 in the state where the insert portion 43 is inserted into the insert hole 40, is provided with an axial through hole 59. And, a cylindrical reinforcing metal 55 is inserted into the through hole 59, specifically molded inside the through-hole 59 upon injection molding the mount flange 45.

Inserted into the reinforcing metal 55 is the threaded portion of the bolt 53 which is threaded into the nut 52 fixed in the stepped concave portion 49 with welding or adhesion. The whole length of the reinforcing metal 55 is substantially equal to the thickness of the mount flange portion 45, so that when the bolt 53 is threaded into the nut 52 for tightening through the mount flange portion 45, the mount flange 45 of synthetic resin is prevented from being collapsed between the head of the bolt 53 and the nut 52.

The operation for incorporating the sensor unit 42 to the cover 18 by assembling the members as mentioned above to form the rolling bearing unit with rotational sensor of the present invention is carried out as follows:

First, the insert portion 43 of the sensor unit 42 is inserted into the short cylindrical portion 41 and the insert hole 40 in the cover 18, and the through hole 59 in the sensor unit 42 is aligned with the nut 52 fixed in the concave stepped portion 49 in the cover 18, and in this state, the axially outer surface of the mount flange portion 45 is abutted to the axially inner side of the projection 39. The dimensions of the parts are regulated such that in this state, a minute clearance with a desired thickness (e.g. about 0.5 mm) exists between the detecting portion on the tip end face of the insert portion 43 and the axially inner surface of the permanent magnet 37 of the encoder 3.

Next, the threaded portion of the bolt 53 is inserted into the reinforcing metal 55 which is inserted into the through hole 59 of the mount flange 45. The threaded portion is threaded to the nut 52 fixed to the stepped concave portion 49 by welding or adhesion for clamping. Thus, the sensor unit 42 is held between the head of the bolt 53 and the nut 52 and fixedly connected to the cover 18.

As mentioned above, the whole length of the reinforcing metal 55 is substantially equal to the thickness of the mount flange portion 45, so that when the bolt 53 is threaded into the nut 52 through the mount flange portion 45 for tightening, the reinforcing metal 55 props between the head of the bolt 53 and the nut 52. Accordingly, the mount flange portion 45 is never distorted under the compression load during being clamped with the bolt 53.

With the rolling bearing unit with the rotational speed sensor as mentioned above, where the sensor is threaded into the cover 18 for fixedly connecting, the manpower for the repair and replacement of the sensor can be reduced.

In addition, the seal at the threaded connecting portion is secured at a lower cost, and the assembling operation of the sensor to the cover 18 is improved. Specifically, in order to threadably connect the sensor to the cover 18, the projection 39 on the cover 18 is not provided with the through hole penetrating through the opposite sides of the cover 18 in the conventional structure, except for the insert hole 40. Accordingly, any foreign matter such as dirty water is prevented from entering from outside through the threaded connecting portion into the space 30 where the rolling members 9 exist. As a result, no seal is required for securing the sealing performance between the sensor and the cover 18 at the portion of threadably connecting the sensor to the cover 18 to reduce the cost of the whole rolling bearing unit with the rotational speed sensor.

The operation to fixedly connect the sensor to the cover 18 is conducted by screwing and tightening the bolt 53 in the nut 52 fixed through welding or adhesion to the stepped concave portion 49 without retaining the nut 52 with a tool. The connecting and fixing operation of the sensor can be carried out with the cover 18 mounted to the outer ring 1. There is no need of removing the cover 18 from the outer ring 1 when installing the sensor to the cover 18. Thus, with the rolling bearing unit with the rotational speed sensor of the present invention, the manpower to fixedly connect the sensor to the cover 18 is reduced and the operation to assemble the rolling bearing unit with the rotational speed sensor is improved, which results in the reduction of the whole cost of the rolling bearing unit with the rotational speed sensor.

As mentioned above, the outer peripheral surface portion of the projection 39 of the cover 18 is continued to the outer peripheral surface of the flange 33 through the bulged portion 58. This is because the insert hole 40 for axially receiving the projection 39 is located radially outside as much as possible. In this structure, the permanent magnet 37 attached to the circular ring portion of the encoder 3 is made large in diameter to enlarge the pole width of the poles (N-pole or S-pole) of the permanent magnet 37 to improve the detection performance of the sensor.

Figure 6:
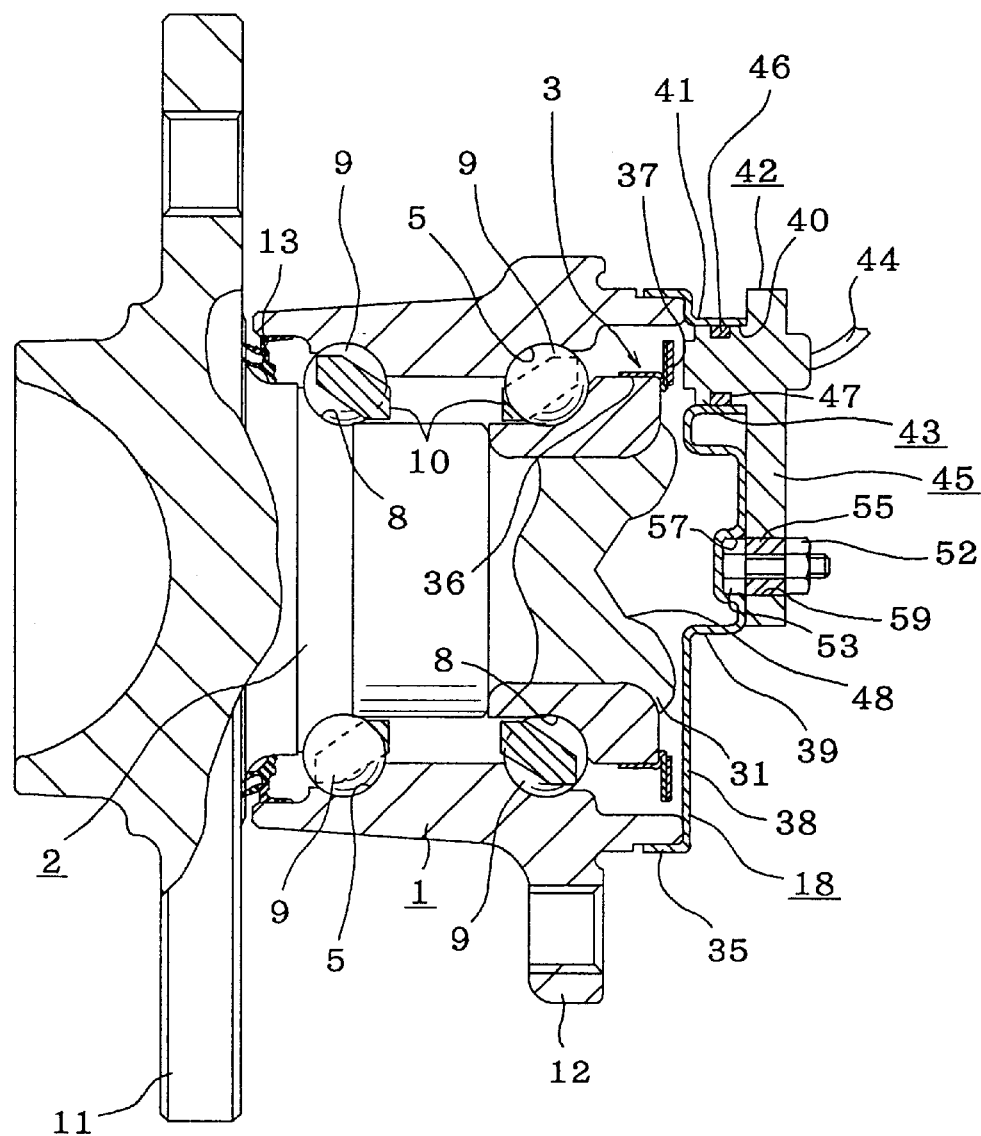
FIG. 6 is a cross sectional view of a second example of the embodiments of the present invention.
Figure 7:
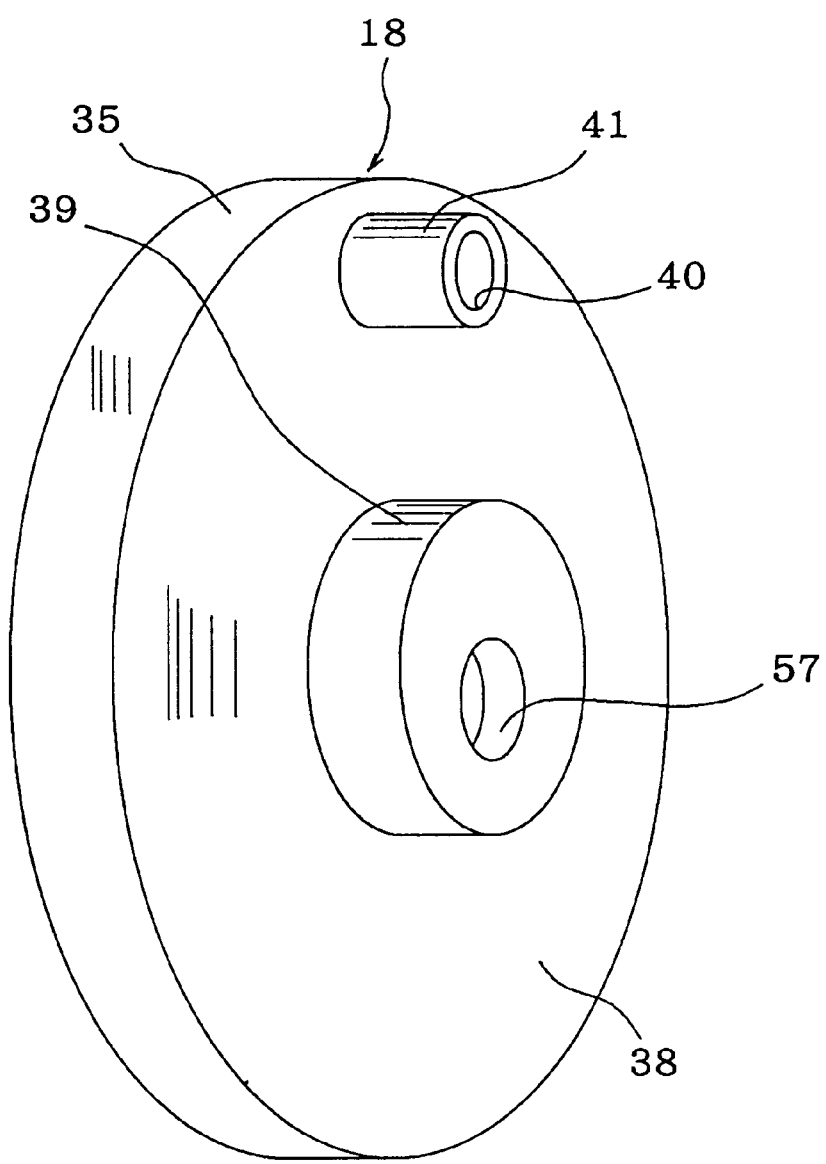
FIG. 7 is a perspective view of the cover of FIG. 6.

FIGS. 6 and 7 show a second example of the present invention, where the cover 18 comprises a fitting portion 35 fitted onto the axially inner end of the outer ring 1 and a bottom plate portion 38 continued from the fitting portion 35. A short cylindrical portion 41 is axially provided on the axially inner surface (right surface in FIG. 6 and front surface in FIG. 7) of the bottom plate portion 38 at a radially outer portion, and a projection 39 at a central side portion thereof, is also axially projected. The axially inner end edge of the outer ring 1 is abutted to the axially outer surface of the bottom plate portion 38 at a radially outer portion. The short cylindrical portion 41 is formed with an insert hole 40 into which the insert portion 43 of the sensor unit 42 is inserted.

Different from the first example, the short cylindrical portion 41 of this example is formed on the opposite side of the encoder 3 with reference to the bottom plate portion 38. The short cylindrical portion 41 and the projection 39 have the same axial height (the amount of projection from the axially inner surface of the bottom plate portion 38), so that the tip end edge of the short cylindrical portion 41 is flush with the tip end face of the projection 39. Part of the axially outer surface (the left surface in FIG. 6) of the mount flange portion 45 of the sensor unit 42 comes into contact with the opening edge of the short cylindrical portion 41 and one face (the right face in FIG. 6 and front face in FIG. 7) of the projection 39.

A concave portion 57, axially not through, is provided in a portion closer to the radially central side on the end surface of the projection 39, facing the concave portion 48 on the inside of the cylindrical portion 31 of the hub 2. The concave portion 57 is a simple, bottomed cylindrical shape with no step portion, which is different from the stepped concave portion 49 in the first example. To this concave portion 57, the head of a bolt 53 is fixed by way of spot welding or adhesive.

The operation to assemble the components as mentioned above to install the sensor unit 42 to the cover 18 to form the rolling bearing unit with the rotational speed sensor of the present invention, is carried out as follows:

First, the insert portion 43 of the sensor unit 42 is inserted into the short cylindrical portion 41 of the cover 18, while the thread portion of the bolt 53 fixed in the concave portion 57 in the projection 39 of the cover 18 is inserted into the through hole 59 in the mount flange 45 of the sensor unit 42. Then, the axially outer surface of the mount flange 45 is abutted to the one face (the right surface in FIG. 6 and the front surface in FIG. 7) of the projection 39. Then, the nut 52 is threaded onto the thread portion of the bolt 53 for tightening, so as to securely fix the sensor unit 42 to the cover 18.

In this example, since no through hole is provided in the cover 18 to connect the sensor to the cover 18 by way of threadable engagement, the foreign matter such as dirty water could not enter from outside through the threadable engagement into the space 30 where the rolling members 9 exist. As a result, there is no need of providing the seal member in order to secure the tight seal in the threadable engagement in the structure for threadably connecting the sensor to the cover 18, which reduces the cost of the whole rolling bearing unit with the rotational speed sensor. In addition, the manpower to securely connect the sensor to the cover 18 is reduced, and the operation of assembling the rolling bearing unit with the rotational peed sensor is improved.

In this example, the short cylindrical portion 41 is provided on the opposite side of the encoder 3 with reference to the bottom plate portion 38, and the portion for abutment of the axially inner end edge of the outer ring 1 can be continuously formed in the circumference without reducing the outer diameter of the encoder 3 comparing with the first example. Specifically, with the short cylindrical portion 41 constructed as mentioned above, the portion where the dies is applied for forming the insert hole 40 in the cover 18 by way of a burring process, is located in the portion on the axially inner surface (the right side surface in FIG. 6) of the bottom plate portion 38 around the insert hole 40. And, the portion where the outer ring 1 is abutted is also around the insert hole 40. Accordingly, the portion where the inner end edge of the outer ring 1 is abutted can be continuously formed in the circumference without reducing the length between the axis center and the center of the insert hole 40, and without reducing the diameter of the encoder 3, comparing with the first example. As a result, the sealing performance between the outer ring i1 and the cover 18 is improved comparing the first example, supposed that the sensor has the same detecting capability.

The other structures and functions are substantially the same as those of the first example, and like members are indicated by like reference numerals and redundant explanation is omitted.

Incidentally, in the first example, the stepped concave portion 49 (FIGS. 3 and 4) in the projection 39 of the cover 18 can be replaced with the simple concave portion as in the second example with the head of the bolt 53 connected into the concave portion, and on the contrary, in the second example, the simple concave portion 57 be replaced with the stepped concave portion as in the first example with the head of the nut 52 connected into the stepped concave portion. These concave portions can be formed in a shape such as of hexagon so that the head of the bolt 53 and the nut 52 could not be rotated when fitted thereinto, and that the welded or adhesion section of the head of the bolt 53 and the nut 52 is subjected to no excessive load.

FIG. 8 shows a third example of the present invention, where the cover 18 is formed with a projection 39 the end surface of which has a portion in alignment with the through-hole 59 of the sensor unit 42 in the state where the insert portion 43 of the sensor unit 42 is inserted into the insert hole 40 of the cover 18, and the portion of the end surface is formed with a bottomed concave portion 60 as in the second example.

In this example, different from the second example, the head of the bolt 53 and the nut 52 (FIG. 6) are not fixed in the concave portion 60, and instead, a female thread portion 74, which is a the nut-like portion, is formed in the inner peripheral surface of the concave portion 60.

The thread portion of the bolt 53 is inserted into the through hole 59 in the sensor unit 42, and then threaded into the female thread portion 74 for tightening, thereby securely connecting the sensor unit 42 to the cover 18. The female thread portion 74 is formed through a tapping process after the concave portion 60 is formed by way of a plastic deforming process.

In the third example, as in the second example, no through-hole is provided in the projection 39 corresponding to the plate portion of the cover 18, when the sensor is threadably connected to the cover 18. Therefore, the foreign matter such as dirty water is prevented from entering the space where the rolling members 9 are located, from outside through the threaded engagement.

In this example, different from the first and second examples, the female thread portion, corresponding to the nut-like portion, is directly formed on the inner peripheral surface of the concave portion 60 of the cover 18, and since the nut 52 is omitted, the number of parts is decreased, resulting in cost reduction.

The other structures and functions are substantially the same as those of the first example, and like members are indicated by like reference numerals and redundant explanation is omitted.

Figure 10:
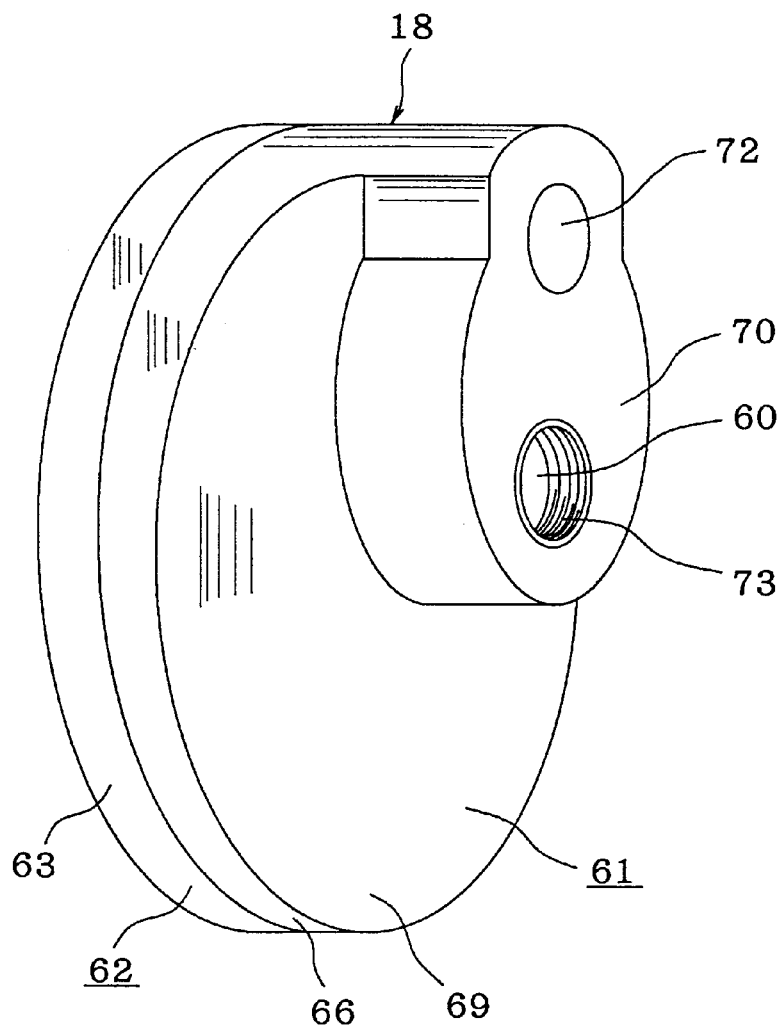
FIG. 10 is a perspective view of the cover of FIG. 9.
Figure 11:
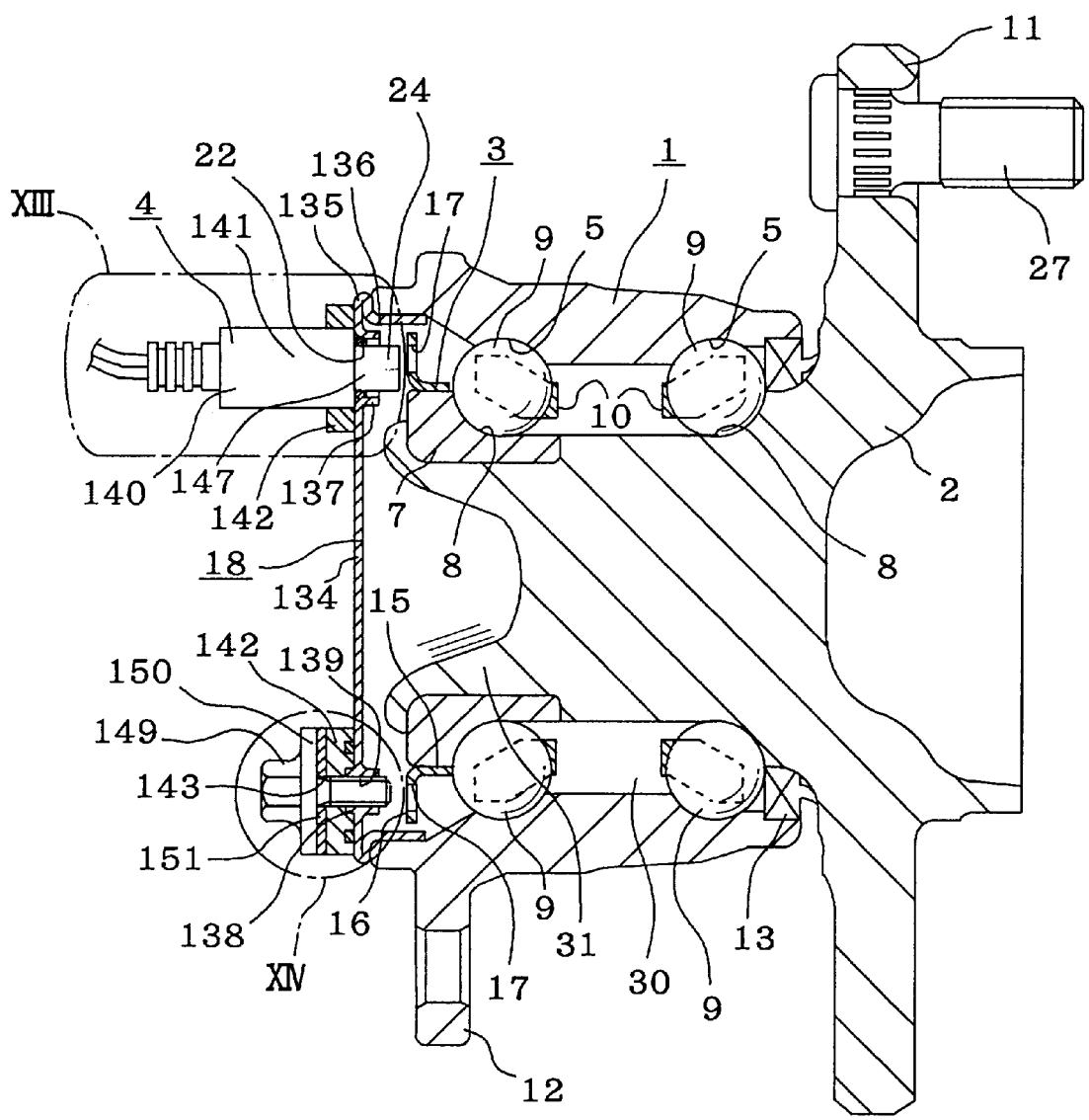
FIG. 11 is a cross sectional view of another example of the embodiments of the present invention, taken along the line XI-O-XI of FIG. 12.
Figure 12:
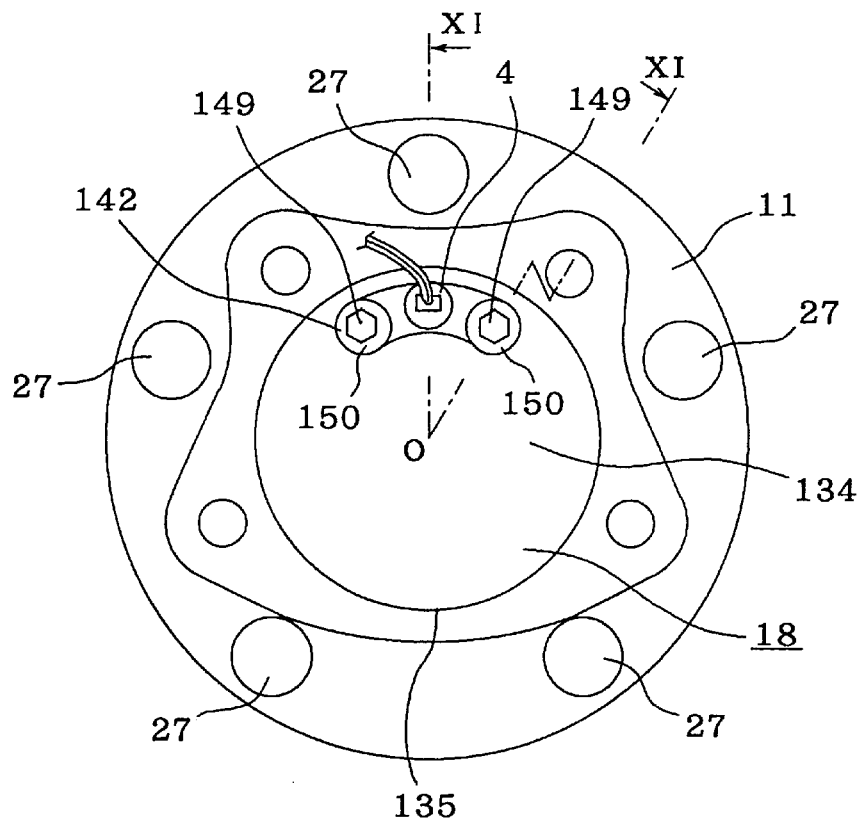
FIG. 12 is a view from left in FIG. 11.
Figure 13:
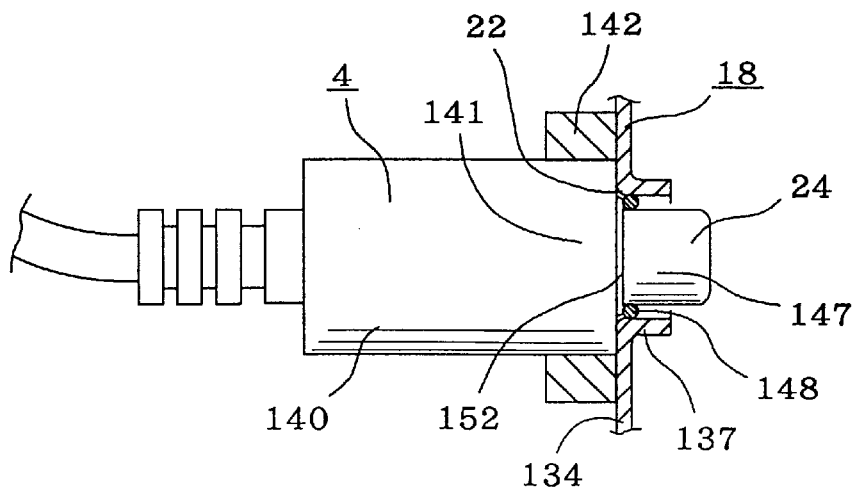
FIG. 13 is an enlarged view of the portion XIII in FIG. 11.
Figure 14:
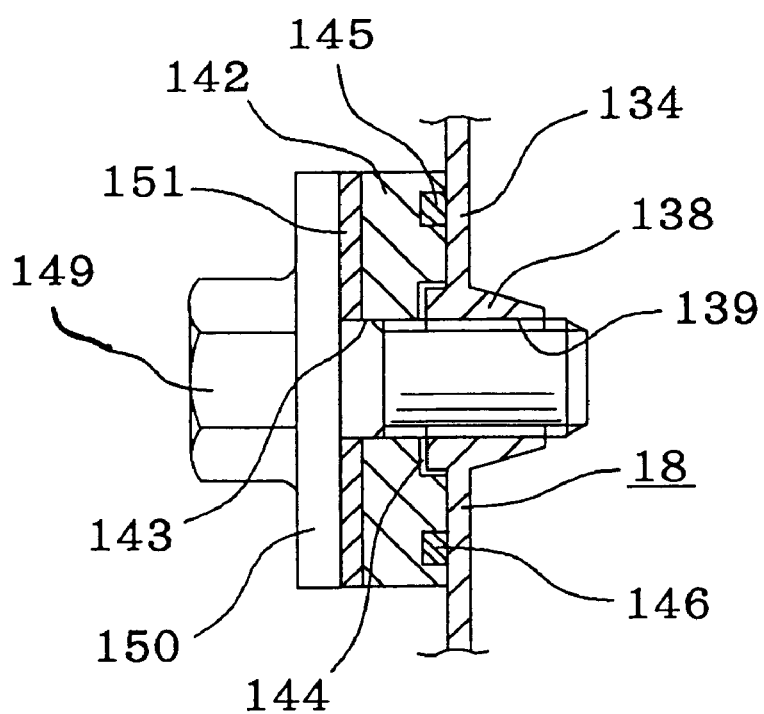
FIG. 14 is an enlarged view of the portion XIV in FIG. 11.

FIGS. 9 and 10 show a fourth example of the present invention, where different from the first to third examples, the cover 18, mounted to the opening portion at the axially inner end of the outer ring 1 to cover the opening, has a portion made of a synthetic resin. Specifically, the cover 18 comprises a bottomed cylindrical main body 61 formed by injection molding the synthetic resin and a fitting tube 62 connected to the opening portion of the main body 61. The fitting portion 62 is made from a corrosion resistant metal plate such as stainless steel and formed in a generally annular shape with L-shaped cross section by way of plastic deformation to comprise a fitting cylindrical portion 63 and an inward flange portion 64 bent radially inward at the base end edge thereof (the right end edge in FIG. 9) of the cylindrical fitting portion 63. The fitting tube 62 is connected to the opening portion of the main body 61 by molding the inward flange portion 64 in the opening end portion of the main body 61 upon injection molding the main body 61.

Incidentally, a number of through holes 65 are provided in the inward flange portion 64 intermittently in the circumferential direction. Part of the synthetic resin of the main body 61 flows into the inside of the through holes 65 upon injection molding the main body 61 to increase the connecting strength between the main body 61 and the fitting tube 62.

The cover 18 thus constructed closes the opening at the axially inner end of the outer ring 1 with the fitting tube portion 63 of the fitting tube 62 fitted onto the axially inner end of the outer ring 1 by way of interference fit. In this state, the end face at the opening portion of the main body 61, specifically the tip end of the cylindrical wall portion 66 on the outer periphery of the main body 61, comes into contact with the axially inner end face of the outer ring 1.

On the tip end face of the cylindrical wall portion 66, an anchoring groove 67 is generally circumferentially formed, and an O-ring 68 is anchored in the anchoring groove 67. In the state where the tip end face of the cylindrical wall portion 66 is abutted to the axially inner end face of the outer ring 1, the O-ring 68 is resiliently compressed between the axially inner end face and the bottom surface of the anchoring groove 67 to seal off the connecting portion between the cover 18 and the outer ring 1 so as to prevent the foreign matter such as dirty water from coming into the cover 18.

At a portion of the axially inside surface (the right side surface in FIG. 9) of the bottom plate portion 69 of the main body 61 of the cover 18, closer to a radially outer portion (the upper portion in FIG. 9), a projection 70 is axially projected.

At a portion in the axially outer surface (the left side surface in FIG. 9) of the bottom plate portion 69, facing the axially inner surface of the encoder 3 fixed to the axially inner end portion of the inner ring 7, an insert hole 72 is provided axially throughout the projection 70, and the insert portion 43 of the sensor unit 42 is inserted into the insert hole 72.

By making part of the outer peripheral wall portion of the projection 70 continued with a circumferential portion of the cylindrical wall portion 66, the insert hole 72 is located radially outward as much as possible.

With this construction, the permanent magnet 37 attached to the circular ring portion of the encoder 3 is enlarged in size, and the pole width of the poles (N-pole or S-pole) of the permanent magnet 37 is larger to improve the detecting capability of the sensor.

In this example, a smaller diameter step portion 71 is formed on the outer peripheral surface at the axially inner end of the inner ring 7. With this smaller diameter step portion 71, the inner ring raceway 8 on the outer peripheral surface of the inner ring 7 is prevented from being deformed under the radially outward force applied to the axially inner end of the inner ring 7 when crimping the cylindrical portion 31 of the hub 2 radially outward.

The encoder 3 has a support ring 36 which is bent by 180 degrees on the outer periphery side, not on the inner periphery side as in the previous examples. If the deformation in shape of the smaller diameter step portion 71 is small, the support ring 36 can be fitted onto the smaller diameter step portion 71.

A bottomed concave portion 60 is provided in a portion of the end face of the projection 70 of the cover 18 which is aligned with the through hole 59 of the sensor unit 42 in the state where the insert portion 43 of the sensor unit 42 is inserted into the insert hole 72 of the cover 18, a nd a female thread portion 74 corresponding to the nut-like portion is formed on the inner peripheral surface of the concave portion 60. In this female thread portion 74, a steel liner 73, referred to as "heli-sert", with threaded inner and outer peripheral surfaces, is anchored. This steel liner 73 is provided to reinforce the thread portion 74 in the cover 18 made of synthetic resin. Specifically, with this liner 73, a steel bolt 53 is directly threaded into the female thread portion 74 in the synthetic resin portion for tightening, so that excessive load is prevented from being applied to the portion of the female thread portion 74.

With the rolling bearing unit with the rotational speed sensor of this example, the thread portion of the bolt 53 inserted into the through hole 59 in the sensor unit 42 is threadably engaged with the liner 73 inserted into the female thread portion 74, and then tightened, so that the sensor unit 42 is securely connected into the cover 18. If the strength of the female thread portion 74 of the cover 18 made of the synthetic resin is secured, the female thread portion 74 is directly connected to the bolt 53, without through the liner 73.

In this example, the main body 61 of the cover 18 is made of a synthetic resin, which makes the whole rolling bearing unit with the rotational speed sensor lightweight.

The other structures and functions are substantially the same as those of the first example, and like members are indicated by like reference numerals and redundant explanation is omitted.

As a modification of the third and fourth examples, at the portion of the cover 18 which is aligned with the through-hole 59 in the sensor unit 42 when the insert portion 43 of the sensor unit 42 is inserted into the insert hole 40 (or 72) in the cover 18, an axially projecting convex portion is provided instead of the bottomed concave portion 60 (FIGS. 8 and 9), and a male thread portion corresponding to the bolt-like portion is formed on the outer peripheral surface of the convex portion. In this case, in the state where the insert portion 43 of the sensor unit 42 is inserted into the insert hole 40 (or 72), the male thread portion of the convex portion inserted into the through hole 59 is threadably engaged with the nut for tightening, so that the sensor unit 42 is securely connected to the cover 18.

In the examples as mentioned above, the structure of the rolling bearing unit comprising the sensor and the encoder is not limited to the structure using the magnetism sensor as illustrated, but applied to the structure using the sensor of the eddy current type, photoelectric type. Also, in the case of using the magnetism sensor, the encoder that is the detected portion is provided not with the permanent magnet, but with through holes provided circumferentially with a uniform interval in the circular ring portion of the encoder, or with gear shaped portions in the circular ring portion.

The present invention is applied to the rolling bearing unit with the rotational speed sensor for supporting the non-driven wheel (the rear wheel of the FF car and the front wheel of the FR car) in all of the examples previously mentioned, but also applied to the structure for supporting the driven wheel (the rear wheel of the FR car and the front wheel of the FF car, all the wheels of the 4WD car). In the case of the present invention applied to the driven wheel, the sensor unit is constructed to be inserted radially into the cover, and the nut-like member or the bolt-like member is provided on the outer peripheral surface of the cover. In this case, the detecting portion adjacently facing the encoder is provided on the side face at the tip end of the insert portion of the sensor unit.

FIGS. 11 to 14 show another example of the embodiments of the present invention.

The stationary ring or outer ring 1, which is not rotate during use, has an opening portion at the axially inner end (the left end in FIG. 11) which is covered and closed by a cover 18. The cover 18 is made from a corrosion resistant metal plate such as stainless steel plate, galvanized steel plate, chromium plate etc. and formed in a generally disc shape through a plastic working process such as press forming, deep drawing process. Specifically, the cover 18 comprises a disc shaped shield plate portion 134, a folded flange portion 135 formed by folding the peripheral edge portion of the shield plate portion 134 by 180 degrees radially inward along the whole circumference, and a fitting tube portion 136 forced by bending at right angles the tip end portion of the folded flange portion 135.

The shield plate portion 134 is formed with a through hole 22 at a location a little radially inward than the fitting tube portion 136. Around the through hole 22, a cylindrical brim portion 137 is formed by bending the peripheral portion of the through hole 22 through a burring process etc.

The shield plate portion 134 is formed with a pair of cylindrical portions 138 on the circumferentially opposite sides of the through hole 22 to provide communication between the outside and inside of the shield plate portion 134.

The cylindrical portions 138 are disclosed in the JP Patent publication TOKUKAISHO NO. 58-84634, and formed by the hot drill process using a heat resistant tool sold under the trade name "Flow drill (TM)" by Daido Kogyo Kabushiki-kaisha. Specifically, by strongly pressing on part of the shield plate 134 a heat resistant tool having a sharp tip end in a conical shape made of tungsten carbide while rotating at a high speed, part of the shield plate 134 is softened by friction heat, so that the part of the shield plate 134 is pierced with the heat resistant tool. As a result, the part of the shield plate 134 is formed with a circular hole and the cylindrical portions 138 are formed along the peripheral portion of the circular hole.

The cylindrical portions 138 project on the both sides of the shield plate portion 134 as shown in FIGS. 11 to 14. The axial length and radial thickness of the cylindrical portions 138 obtained are longer and thicker than those of the one made through the burring process.

In order to provide the cylindrical portion with a smooth end edge (not zig zag shaped) through the burring process, a small circular hole must be previously formed at the portion where the cylindrical portion is formed, which is referred to as "pierce burring". In this case, the resulting axial size of the cylindrical portion is smaller, and the thickness becomes smaller than the original thickness of material.

On the other hand, when the cylindrical portion is made by the hot drill process, the blank portion located at the portion to be formed in the cylindrical portion becomes the cylindrical portion without diemention change, so that the axial length and the radial thickness of the resulting cylindrical portions 138 can be sufficiently large.

A female thread portion 139 by way of a tapping process is formed on the inner peripheral surface of each of the cylindrical portions 138 formed by way of the hot drill process.

Since the thickness of the cover 18 is generally 1 mm and the screw threaded onto the female thread portions 139 is generally of the M6 type, the burring process which is conventionally generally utilized can not afford to form the sufficiently long female thread portions 139, and it is difficult to put the structure of the present invention in practice.

On the other hand, by forming the cylindrical portions 138 with the hot drill process, the resulting female thread portion with the length of about 3 mm to about 5 mm can afford to be sufficiently put in practice under the conditions as mentioned above.

The fitting tube portion 136 of the cover 18 is fitted into the axially inner end of the outer ring 1 with interference fit to cover the opening at the axially inner end of the outer ring 1. In this state, the axially outer surface of the folded flange portion 135 comes into contact with the axially inner end face of the outer ring 1.

The seal performance of the fitting portion between the fitting tube portion 136 and the outer ring 1 is generally secured with the interference fit, but if the more tight seat performance is required, any seal agent such as coking material is coated on the outer peripheral surface of the fitting tube portion 136 before the fitting operation.

The encoder 3 constructed as in the conventional construction as mentioned above is fitted onto the axially inner end portion (the left end portion) of the inner ring 7 which composes the rotatable ring together with the hub 2. The through hole 22 and the brim portion 137 of the cover 18 are formed to face the circular ring portion 16 of the encoder 3.

Part of the sensor 4 is inserted into the through hole 22 and the brim portion 137. The sensor 4 has a detecting unit to change the output as the encoder 3 rotates, and the detecting unit is embedded in a nd supported by the main body 141 of the hold er 140 as in the conventional structure.

The holder 140 comprises a cylindrical main body 141 of synthetic resin, and a metal flange portion 142 fixed on the outer peripheral surface at the middle portion of the main body 141. The flange portion 142 is integrally molded around the main body 141 upon injection molding the main body 141, so as to be fixedly supported by the main body 14o1. The main body 141 and the flange portion 142 can be made of a high functional polymer of sufficient strength and integrally molded.

Formed at the tip end portion or outer end portion (the right end portion in FIGS. 11 and 14) of the main body 141 is an insert portion 147 which has a diameter smaller than the outer diameter of the other portion of the main body 141 and the inner diameter of the brim portion 137.

A second through hole 143 is formed at the circumferentially opposite portion to the flange portion 142, facing the pair of the cylindrical portions 138 in the state where the insert portion 147 is inserted into the brim portion 137.

An annular recess portion 144 is circumferentially formed at the peripheral edge of the opening at the outer end of the through hole 143 to avoid the interference with the cylindrical portions 138, while an anchoring groove 145 is circumferentially formed around the annular recess portion 144 to anchor the O-ring 146 of the seal member.

The operation to mount the sensor 4 to the cover 18 is carried out as follows:

First, the O-ring 148 is fitted onto the insert portion 147 on the main body 141 of the holder 140 of the sensor 4, and then the insert portion 147 is inserted into the brim portion 137. The O-ring 148 is resiliently compressed between the outer peripheral surface of the insert portion 147 and the inner peripheral surface of the brim portion 137 to seal the portion of the insert portion 147 inserted into the brim portion 137 in the state where the insert portion 147 is inserted into the brim portion 137.

A stepped portion 152 is formed on the base end portion of the insert portion 147 to force the O-ring 148 deeply into the brim portion 137. Without this stepped portion 152, the outer peripheral edge of the O-ring 148 would not be sufficiently compressed facing the curved portion at the base end portion of the brim portion 137, resulting in insufficient seal performance.

In this state, the O-ring 146 previously anchored in the anchoring grooves 145 is resiliently compressed between the bottom surface of the anchoring grooves 145 and the shield plate portion 134 of the cover 18 for sealing between the shield plate portion 134 and the flange portion 142. At this moment, the end of the cylindrical portions 138 enters the annular recess 144, and the flanged portion 142 comes into contact with the shield plate 134. Thus, the insert portion 147 is inserted into the brim portion 137, and the flange portion 142 is abutted to the shield plate portion 134, and the second through holes 143 on the circumferentially opposite ends of the flange portion 142 are aligned with the opening end portion of the cylindrical portions 138. And then, a screw 149 is inserted into the second through hole 143, respectively and threaded with the female thread portion 139 on the inner peripheral surface of the cylindrical portions 138 for tightening. The dimensions and position relations of the components are controlled such that a predetermined clearance e.g. of the thickness of about 0.5 mm exists between the tip end face (the right end face in FIGS. 11 and 14) of the sensor 4 and the axially inner surface of the circular ring portion 16 of the encoder 3 when the screws 149 are tightened.

In the example illustrated, a flanged bolt is used for the screws 149, respectively, and a packing 151 in a sheet shape is clamped between the flange 150 provided adjacent the head of the screws 149 and the flanged portion 142. The packing 151 is resiliently compressed between the flange 150 and the flanged portion 142 for sealing therebetween.

The O-ring 146 and packing 151 prevent the foreign matter such as rain water on the outside of the cover 18 from entering the interior of the cover 18 through the clearance in the threaded engagement portion between the female thread portion 139 and the screws 149. If the viscous seal member such as coking agent is coated on the inner peripheral surface of the female thread portion 139 or on the outer peripheral surface of the screws 149 to close the clearance in the threaded engagement portion, the O-ring 146 and the packing 151 can be omitted. However, when the coking agent is used, the coating is required every time when the screws 149 are disengaged from and then again engaged with the female thread portions 139.

Anyhow, there is no need of the means for stopping the rotation of the nut 6 (FIG. 1) etc. as in the conventional structure as mentioned above when the screws 149 are tightened to fix the sensor 4 to the cover 18 for supporting. Tightening and loosening of the screws 149 can be carried out while the cover 18 is mounted to the stationary ring or outer ring 1. Specifically there is no need of removing the cover 18 from the outer ring 1 when incorporating the sensor 4 in the cover 18 mounted to the outer ring 1. Accordingly, the repair and replacement of the sensor 4 can be easily carried out.

Since the O-rings 146, 148 and the packing 151 prevent the foreign matter such as rain water on the outside of the cover 18 from entering the interior of the cover 18, the encoder 3 within the cover 18 is not eroded and the grease in the portion where the rolling members 9 are set is not deteriorated.

Figure 15:
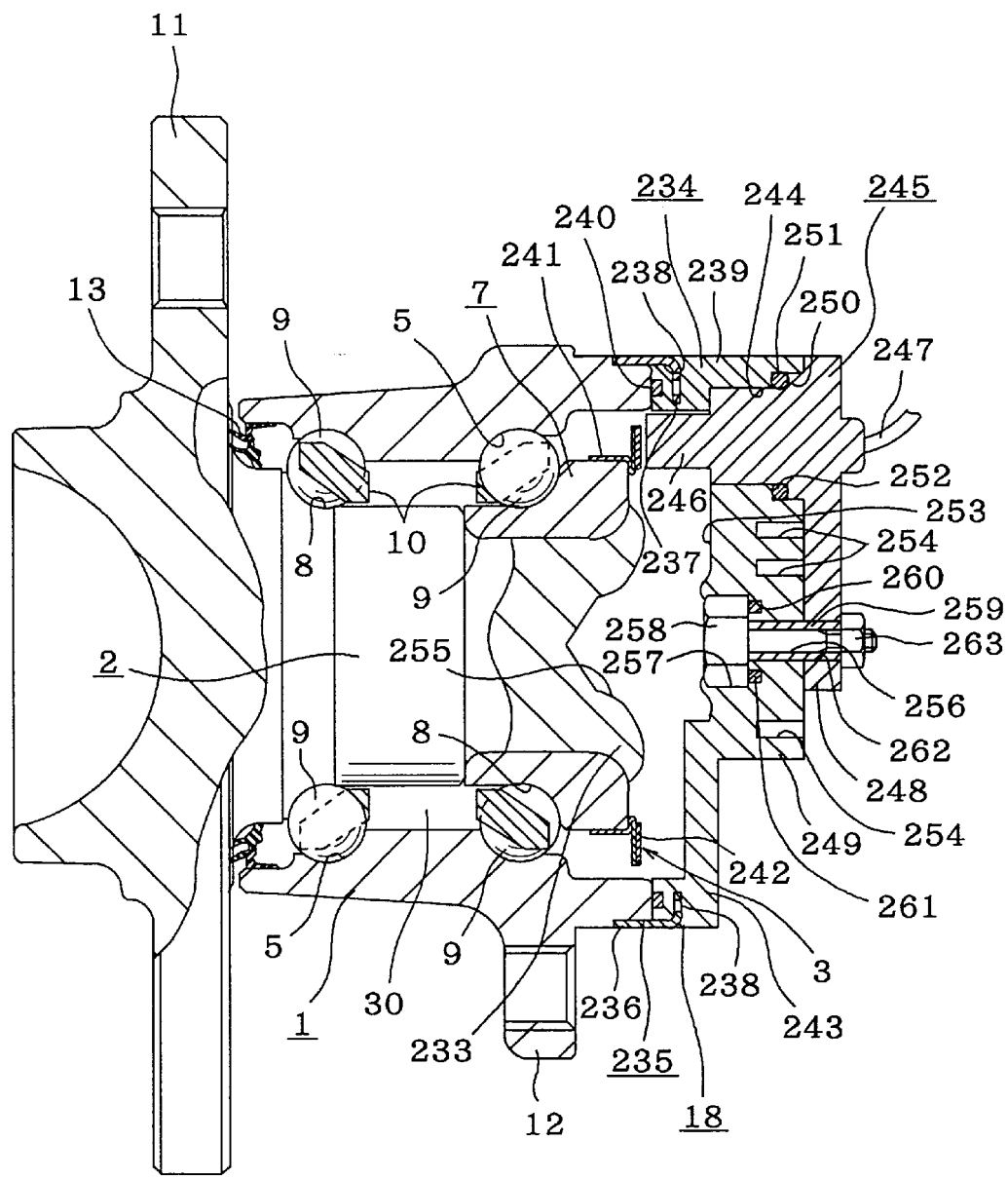
FIG. 15 is a cross sectional view of another example of the embodiments of the present invention.
Figure 16:
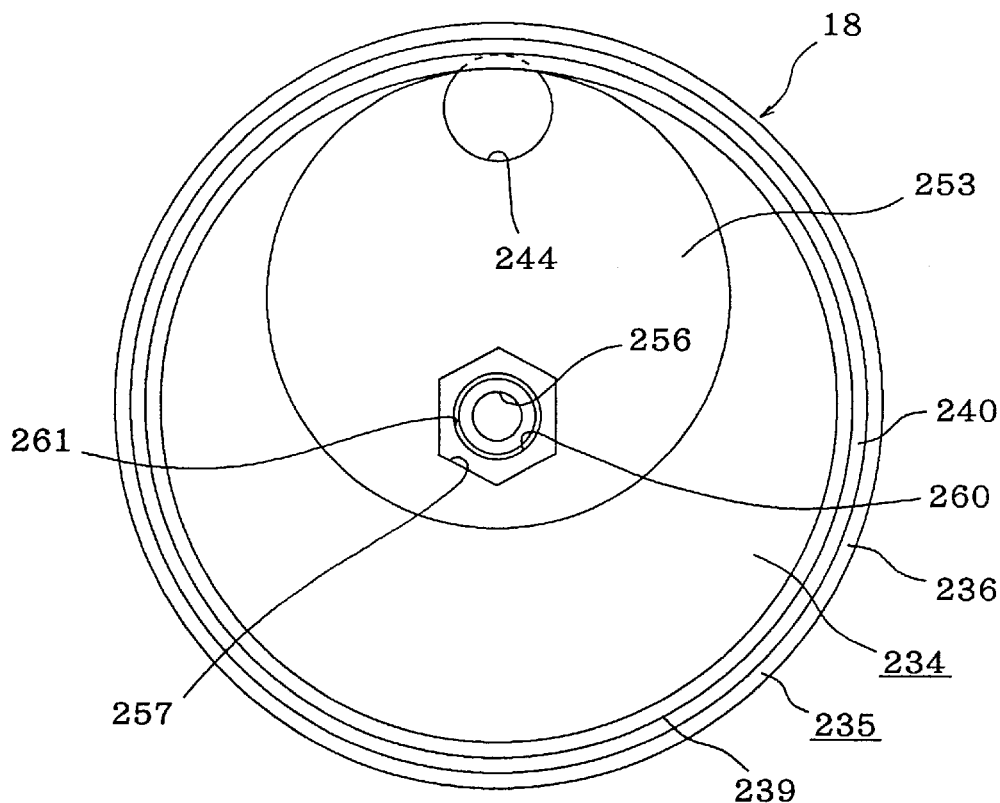
FIG. 16 is a view from left in FIG. 15 to show the cover only.
Figure 17:
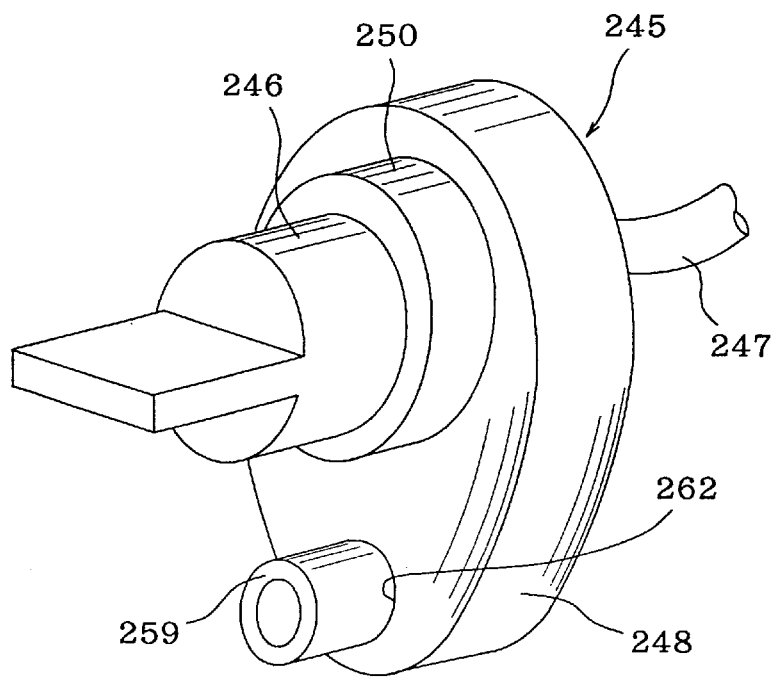
FIG. 17 is a perspective view of the harness and the sensor unit.

FIGS. 15 to 17 show another example of the embodiments of the present invention.

The cover 18 comprises a bottomed cylindrical main body 234 made of a synthetic resin by way of injection molding, and a fitting tube portion 235 connected to the opening portion of the main body 234. The fitting tube portion 235 is formed from a corrosion resistant metal plate such as stainless steel by way of plastic deformation to have a generally annular shape with L-shaped cross section, and comprised of a fitting tube portion 236 and an inward facing flange portion 237 bent radially inward at the base end edge (the right end edge in FIG. 15) of the fitting tube portion 236. The fitting tube portion 235 is connected to the opening portion of the main body 234 by molding the inward facing flange 237 in the open end edge of the main body 234 upon injection molding of the main body 234.

The inward facing flange 237 is formed with through holes 238 circumferentially intermittently. Part of the synthetic resin to compose the main body 234 enters the interior of the through holes 238 upon injection molding of the main body 234, thereby increasing the connecting strength of the main body 234 with the fitting tube 236.

The fitting tube portion 236 of the fitting tube 235 of the cover 18 is fitted onto the axially inner end portion of the outer ring 1 with interference fit, so that the opening end portion at the axially inner end of the outer ring 1 is closed with the cover 18. In this state, the tip end face of the cylindrical wall portion 239 formed on the outer peripheral edge portion of the main body 234, that is the end face of the opening end portion of the main body 234 comes into contact with the axially inner end face of the outer ring 1.

An anchoring groove is formed generally circumferentially on the tip end face of the cylindrical wall portion 239, and an o-ring 240 is anchored in the anchoring groove. In the state where the tip end face of the cylindrical wall portion 239 is abutted to the axially inner end face of the outer ring 1, the O-ring 240 is resiliently compressed between the axially inner end face and the bottom surface of the anchoring groove to seal the connecting portion between the cover 18 and the outer ring 1 so as to prevent the foreign matter such as dirty water from entering the cover 18.

The encoder 3 is securely fitted onto the axially inner end portion (the right end portion in FIG. 15) of the inner ring 7 which cooperates with the hub 2 to form the inner- ring-like member. The encoder 3 comprises a support ring 241 and a permanent magnet 242. The support ring 241 is made from a magnetic metal plate such as SPCC and formed by a bending or drawing process in a generally annular shape with a T-shaped cross section, and fitted onto the axially inner end portion of the inner ring 7 with an interference fit.

The permanent magnet 242 is made from a rubber with ferrite powders mixed therein and attached to the axially inner surface of the circular ring portion of the support ring 241 by way of seizure etc.

The permanent magnet 242 is magnetized axially (right and left directions in FIG. 15) and the pole directions thereof are changed circumferentially alternately with a uniform interval. Accordingly, S-poles and N-poles are provided circumferentially alternately with a uniform interval on the axially inner surface of the encoder 3.

Since the encoder 3 is formed in the substantially T-shape in cross section, the inner diameter of the permanent magnet 242 attached to the circular ring portion of the support ring 241 of the encoder 3 can be made smaller than the outer diameter of the shoulder portion of the inner ring 7 so as to enlarge the pole area of the poles (N-poles or S-poles) of the permanent magnet 242, which improves the detecting capability of the sensor with respect to the detected portion of the encoder 3.

A projection 249 is provided to axially project from the axially inner surface (right side surface in FIG. 15) of the bottom plate portion 243 of the main body 234 of the cover 18, specifically from a radially outer portion (an upper portion in FIG. 15) of the axially inner surface of the bottom plate portion 243. And, a concave portion 253 is formed on a portion corresponding to the projection 249 on the axially outer surface (leftside surface in FIG. 15) of the bottom plate portion 243.

A through hole 244 is formed in part of the projection 249, facing the axially inner surface of the permanent magnet 242 of the encoder 3, such that the through hole 244 extends throughout the bottom plate portion 243 in the axial direction.

Inserted into the through hole 244 without play is an insert portion 246 which is provided on a portion of the sensor unit 245 closer to its tip end (the left end in FIG. 15, and the front end in FIG. 17) supported in the sensor holder. The detecting portion of the sensor is located in the tip end face portion of the insert portion 246. The sensor unit 245 has a sensor comprising an IC having a magnetism detecting element such as the Hall element, magnetism resistance element (MR element), which characteristics change corresponding to the flow directions of the magnetic flux and a waveform shaping circuit to shape the output waveform from the magnetism detecting element, and a pole piece of magnetic material to introduce the magnetic flux from the permanent magnet 242 (or into the permanent magnet 242) to the magnetism detecting element, which are embedded in a holder of synthetic resin. A harness 247 is provided to send the output signal of shaped waveform from the IC to a control device (not shown in the drawings), and an end portion of the harness 247 is directly (through no connector) connected to the sensor unit 245. Since the connector is omitted, the cost of the rolling bearing unit with the rotational speed sensor can be reduced.

The tip half portion including the detecting portion of the insert portion 246 of the sensor unit 245 is formed in a rectangular prism shape as illustrated in FIG. 17, so that while the interference between the tip half portion and the fitting tube portion 235 and the O-ring 240 is prevented, the detecting portion on the tip end face of the tip half portion is located radially outward as much as possible, so that the encoder 3 facing the detecting portion can be enlarged in diameter. Accordingly, the pole width of the poles (N-poles or S-poles) of the permanent magnet 242 attached to the encoder 3 is made larger to improve the detecting capability of the sensor.

A larger diameter portion 250 is formed in the insert portion 246 at a portion closer to the base end (closer to the right end in FIG. 15 and closer to the rear side end in FIG. 17). A seal ring or O-ring 252 is provided between the outside surface of the larger diameter portion 250 and the anchoring groove 251 formed in a closed annular shape on the peripheral edge portion at the axially inner end opening of the through-hole 244. With the insert portion 246 inserted into the through hole 244, the O-ring 252 is resiliently compressed between the outer peripheral surface of the larger diameter portion 250 and the anchoring groove 251 to provide a seal between the cover 18 and the insert portion 246 of the sensor unit 245. Specifically, the O-ring 252 prevents the foreign matter such as dirty water from entering the interior of the outer ring 1 and the cover 18 through the through-hole 244. As a result, the durability of the rolling bearing unit is secured, and the foreign matter such as magnetic powders is prevented from adhering to the side surface of the permanent magnet 242 of the encoder 3, so that the precision of detecting the rotational speed is prevented from being deteriorated.

Instead of the O-ring 252, any other rings such as X-ring with a X-shaped cross section can be used as the seal ring for sealing the insert portion 246 of the sensor unit 245 for attachment to the cover 18, so that the force to insert the insert portion 246 of the sensor unit 245 to the through-hole 244 is reduced so as to make easy the inserting operation of the sensor unit 245.

A mount flange portion 248 is provided at a portion of the sensor unit 245 closer to the base end thereof (closer to the right end in FIG. 15, and closer to the rear end in FIG. 17), such that the base end portion (the upper ends in FIGS. 15 and 17) of the mount flange 248 is connected to an end portion of the insert portion 246 of the sensor unit 245. The mount flange portion 248 has its axially outer surface (the left end face in FIG. 15, and the front end face in FIG. 17) shaped so as to come into contact with a portion of the end face of the projection 249 of the cover 18, and the contact surfaces of the mount flange portion 248 and the projection 249 are formed in a smooth surface.

At a portion closer to the radial center of the bottom plate portion 243 of the cover 18, facing the recess portion 255 on the axially inner side of the cylindrical portion 233 of the hub 2, a second through-hole 256 is provided in parallel to the through hole 244 and extends throughout the bottom plate portion 243.

Provided on the peripheral edge portion of the opening on one end side (the left side in FIG. 15) of the second through-hole 256 is a recess portion 257 which has an inner peripheral surface in a non-cylindrical shape, and which the head of the bolt 258 having an outer peripheral surface in a hexagonal cylindrical shape is press-fitted into. In this state, the portion of the axially outer surface of the cover 18 around the end face of the head of the bolt 258 is thermally crimped radially inward toward the head, so that the head of the bolt 258 is prevented from being taken off from the recess portion 257.

In this state, the outer peripheral surface of the head of the bolt 258 is engaged with the inner peripheral surface of the recess portion 257 to prevent the bolt 258 from rotating with reference to the cover 18. The outer diameter of the thread portion of the bolt 258 is slightly smaller than the inner diameter of the second through-hole 256, so that a cylindrical clearance is formed between the outer peripheral surface of the thread portion and the inner peripheral surface of the second through hole 256. In this cylindrical clearance, a cylindrical sleeve 259 provided in part of the sensor unit 245 can be inserted, which is detailed later.

The outer diameter of the head of the bolt 258 is larger than the head of the generally used bolts in order to avoid any damages of the recess portion 257 of the synthetic resin, weaker in strength than steel, by the head of the bolt 258 when the nut 263 described later is tightened to apply a force to the bolt 258 in a rotation direction, so that the outside peripheral surface of the head of the bolt 258 is pressed to the inner peripheral surface of the recessed portion 257.

An anchoring groove 260 in a closed annular shape is formed around the opening of the second through hole 256 on the bottom surface of the recess portion 257. And, an O-ring 261 is mounted to the anchoring groove 260 for sealing. In the state where the head of the bolt 258 is press fitted into the recess portion 257, the O-ring 261 is resiliently compressed along the whole periphery at a portion of the axially inner surface of the head of the bolt 258 to provide a seal between the bolt 258 and the bottom plate portion 243.

Ts prevents the foreign matter such as dirty water from entering the interior of the cover 18 through the second through-hole 256.

A plurality of axially deep grooves 254 are formed on the axially inner surface of the projection 249 on the cover 18 in order to make the plate thickness of synthetic resin uniform to prevent any voids and cracks from occurring due to shrinkage upon molding, which makes the thick projection 249 of the cover 18 hollow, to prevent any distortion in the cover 18 upon forming the cover 18 through injection-molding of the resin.

A third through-hole 262 extends throughout a portion on the tip end of the mount flange portion 248 of the sensor unit 245, in alignment with the opening portion on the other end side (right side in FIG. 15) of the second through hole 256 of the cover 18 when the insert portion 246 is inserted into the through hole 244.

A cylindrical sleeve or reinforcing metal 259 is formed by molding on the inside of the third through-hole 262 upon injection-molding of the mount flange 248 to have its axially inner half portion inserted into the third through hole 262. The thread portion of the bolt 258 with the head thereof engaged with the recess portion 257 can be inserted into the interior of the sleeve 259. The total length of the sleeve 259 is substantially the same to the sum of the whole length of the third through hole 262 and the whole length of the second through hole 256, so that the axially outer half of the sleeve 259 projects from the axially outer surface of the mount flange portion 248. This prevents the mount flange portion 248 and the cover 18 made of synthetic resin from being collapsed by the head of the bolt 258 and the nut 263 when the bolt 258 is tightened with the nut 263 with the second and third through holes 256, 262 therebetween.

The operation to incorporate the sensor unit 245 in the cover 18 to assemble the rolling bearing unit with the rotational speed sensor of the present invention with the components as mentioned above combined, is as follows;

First, the insert portion 246 of the sensor unit 245 is inserted into the through hole 244 of the cover 18. Then, the second through hole 256 in the cover 18 is aligned with the third through hole 262 of the sensor unit 245. Then, the sleeve 259 is inserted into the second through hole 256 to abut the axially outer surface of the mount flange 248 to the axially inner surface of the projection 249 in the cover 18.

In this state, the components are regulated in dimensions such that a clearance with a predetermined thickness (e.g. about 0.5 mm) is formed between the detecting portion provided on the tip end face of the insert portion 246 and the axially inner surface of the permanent magnet 242 of the encoder 3.

Part of the thread portion of the bolt 258 inserted into the sleeve 259 projects from the axially inner surface of the mount flange portion 248, and the nut 263 is threaded and tightened onto the part, so that the sensor unit 245 and the cover 18 are held between the head of the bolt 258 and the nut 263 and that the sensor unit 245 is fixedly connected to the cover 18.

Since the whole length of the sleeve 259 is controlled as mentioned above, when the bolt 258 and the nut 263 are threaded and tightened through the mount flange 248 and the cover 18, the sleeve 259 props between the head of the bolt 258 and the nut 263. Accordingly, the permanent set or deformation due to the compression lo ad which would be caused by tightening with the nut 263, is prevented from occurring in part of the sensor unit 245 and the cover 18.

With the rolling bearing unit with the rotational speed sensor of the present invention constructed as mentioned above, since the sensor is securely connected to the cover 18 with the threadable engagement, the manpower for the repair and replacement of the sensor is reduced. In addition, the operation to incorporate the sensor to the cover 18 is improved. Specifically, the head of the bolt 258 is never rotated with respect to the cover 18 on the basis of the engagement between the inner peripheral surface in a non-cylindrical shape of the recess portion 257 in the cover 18 and the outer peripheral surface of the bolt head. Accordingly, only the nut 263 is tightened without retaining the bolt 258 when the bolt 258 is inserted into the second through-hole 256 and the third through hole 262 for threadable engagement with the nut 263 to securely connect the sensor unit 245 to the cover 18 through threadable engagement. The operation to securely connecting the sensor unit 245 to the cover 18 can be done with the cover 18 mounted to the outer ring 1, and the manpower to remove the cover 18 from the outer ring 1 is omitted.

With the rolling bearing unit with the rotational speed sensor of the present invention, an O-ring 261 is mounted to the anchoring groove 260 in a closed annular shape formed on the inside surface of the recess portion 257 in the bottom plate portion 243 of the main body 234 of synthetic resin. The O-ring 261 is resiliently compressed along the whole periphery on part of the head of the bolt 258 to provide a seal between the bolt 258 and the bottom plate portion 243. Thus, it is possible to form the anchoring groove 260 at least partly because the bottom plate portion 243 is made of synthetic resin.

The O-ring 261, mounted to the anchoring groove 260, is never subjected to a large compression force based on the clamping between the head of the bolt 258 and the plate portion 234 because the sleeve 259 is designed to have a high strength enough to bear a substantial part of compression load of clamping. Specifically, even when the compression force is exerted to the O-ring due to the clamping, part of the O-ring can move in the anchoring groove 260, so that the O-ring 261 is not subjected to so large a compression force to deteriorate the durability of the O-ring 261. Accordingly, the durability of the O-ring 261 is increased to secure the sufficient seat performance at the threadable engagement portion for a long time. In addition, since the main body 234 of the cover 18 is made of synthetic resin, the rolling bearing unit can be totally lightweight.

Figure 18:
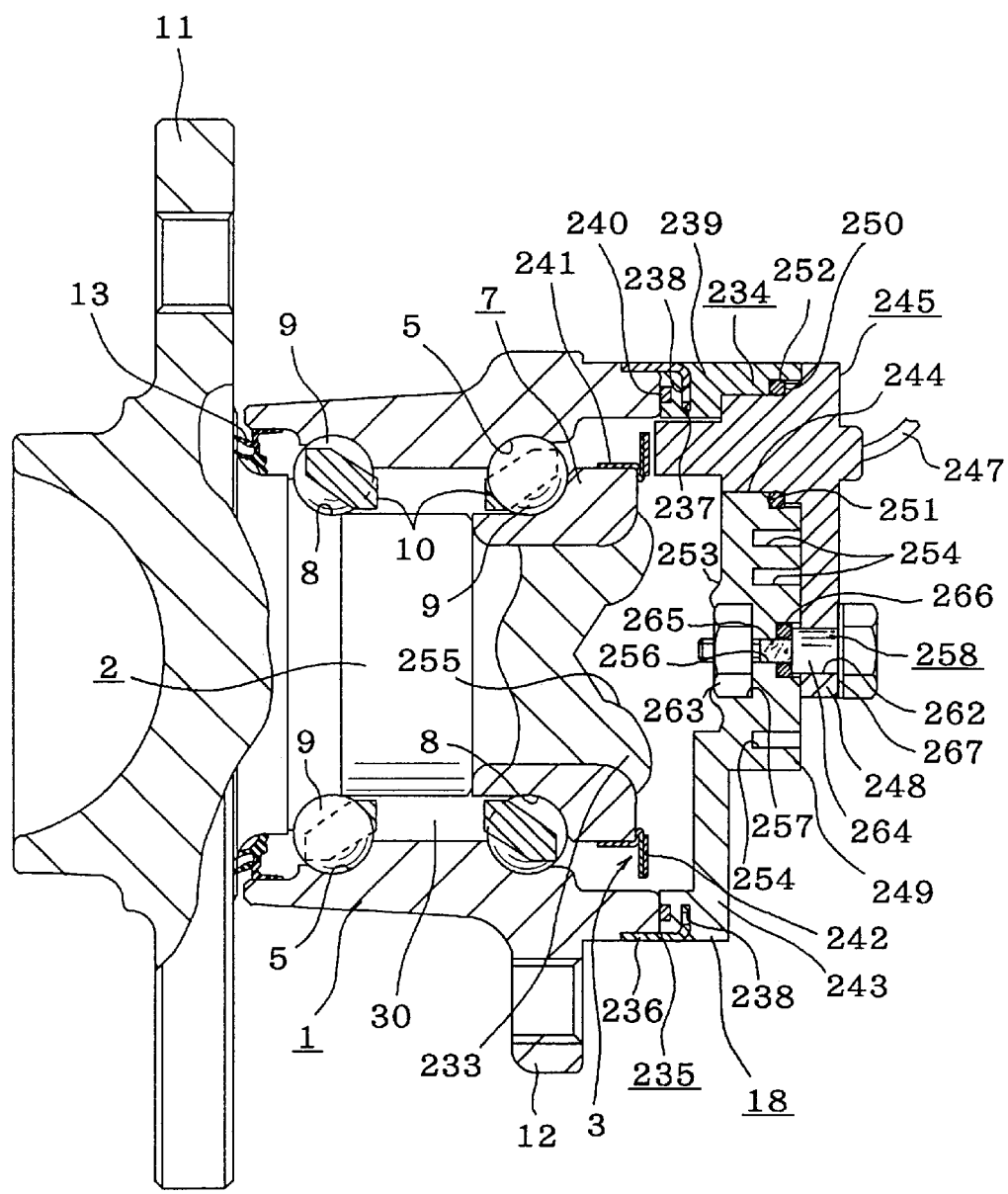
FIG. 18 is a cross sectional view of another example of the embodiments of the present invention.

FIG. 18 shows another example of the embodiments of the present invention, where a nut 263 in a hexagonal prism shape, not the head of the bolt 258, is press fitted into the non-cylindrical recess portion 257 of the cover 18, which is different from the previous example. In addition, the peripheral portion of the end face of the nut 263 is thermally crimped on the axially outer surface of the cover 18, so that the nut 263 is prevented from being taken off from the recess portion 257. A bolt 258 is inserted into the third hole 262 in the mount flange 248 of the sensor unit 245 and through the second through hole 256 in the cover 18, and threaded into the nut 263. By tightening only the bolt 258, the sensor unit 245 is securely connected to the cover 18.

In this example, different from the previous example, the cylindrical sleeve 259 as shown in FIGS. 15 and 17 is not inserted into the third through hole 262. Instead, the inner diameter of the third through hole 262 is larger than the inner diameter of the second through hole 256, and the bolt 258 is inserted into the third through hole 262 and the second through hole 256. Accordingly, the bolt 258 comprises a larger diameter portion 264 on the base end side and the smaller diameter portion 265 on the tip end side in a stepped shape, and the smaller diameter portion 265 is formed with a thread portion. In addition, the diameter of the head of the bolt 258 and the outer diameter of the nut 263 in threadable engagement with the bolt 258 are sufficiently larger than the outer diameter of the smaller diameter portion 265 of the bolt 258. This prevents any permanent set or deformation from occurring in part of the sensor unit 245 or the cover 18 due to the compression load based on tightening between the bolt 258 and the nut 263 because the surface pressure becomes small with the contact areas increased between the bolt seat face, mount flange, and between the nut seat face and the cover.

An engagement groove in a closed annular shape is formed in the peripheral edge portion of the opening at the other end side (the right side in FIG. 18) of the second through hole 256, and an O-ring or seal ring 266 is mounted into the engagement groove. In the state where the bolt 258 is threaded with the nut 263 for tightening, the O-ring 266 is resiliently contacted generally circumferentially with part of the bolt 258 to provide a seal between the bolt 258 and the plate portion 234.

Accordingly, the O-ring 266 is not subjected to a large compression force to deteriorate the durability of the O-ring 266 due to the compression load based on the clamping of the bolt 258 because it is designed that a substantial part of the compression load to the bolt is borne at the contact portion between the bolt and nut seat faces. The durability of the o-ring 266 is improved to secure the sealing performance at tile threadable connecting portion for a long time.

A circular ring shaped resilient washer 267 made from a resilient material such as rubber or hytrel is fixed or attached to a surface portion of the head of the bolt 258 facing the sensor unit 245 by way of seizure, adhesion etc. With the nut 263 threaded to the bolt 258, the resilient washer 267 is held between the side face of the head of the bolt 258 and the side face of the sensor unit 245. Thus, since the resilient washer 267 is held between the bolt 258 and the sensor unit 245 of synthetic resin, the bolt 258 is prevented from being loosened even when the differences in thermal expansion due to temperature change are caused between the bolt 258, cover 18 and sensor unit 245 made of different materials, the sensor unit 245 and tie cover 18 are prevented from being partly excessively compressed by the bolt 258 and nut 263 to cause permanent set or deformation.

The other structure and operation are substantially the same to those of the previous example.

The shape of the inner peripheral surface of the recessed portion in a noncircular shape in the cover is not limited to the hexagonal prizm shape in the previous examples. It is enough that the bolt and nut are prevented from relatively rotating based on the engagement between the inner peripheral surface of the recessed portion and the head of the bolt or the outer peripheral surface of the nut. For example, the shape of the recessed portion can be a semicylindrical shape with or rectangular prism shape to provide engagement between part of the head of the bolt and part of the side surface of the nut.

The construction of the rotational speed sensor comprising the sensor and the encoder is not limited to using the magnetism sensor as illustrated, and can be provided with the sensor of the eddy current type or photoelectric type.

In the case of using the magnetism sensor, the encoder for the detected portion is provided, instead of with the permanent magnet, with a circular ring portion having a plurality of through holes circumferentially arranged with a uniform interval or with a circular ring portion formed in a gear shape.

Incidentally, in the examples from FIG. 3 to FIG. 18, the detected portion of the encoder is formed in an annular shape, and the sensor faces axially to the encoder. But, it is possible to provide a structure where the detected portion of the encoder is formed in a cylindrical portion, and the sensor faces radially to the encoder.

With the rolling bearing unit with the rotational speed sensor of the present invention constructed as mentioned above, the structure of threadable engagement for connecting the sensor to the cover is used to reduce the manpower for the repair and replacement of the sensor, and the seal member to seal the threadable engagement portion is omitted or improved in durability for a long time seal performance, and the whole cost of the rolling bearing unit with the rotational speed sensor is reduced, achieving a lightweight unit. The manpower to securely connect the sensor to the cover is reduced, and the operation to assemble the rolling bearing unit with the rotational speed sensor is improved. The improvement of the operation can lead to the cost reduction of the rolling bearing unit with the rotational speed sensor. The sensor conventionally used in the threadable engagement for fixing with the cover can be applied to the present invention, thus the common use of parts are possible.

What is claimed is:

1. A rolling bearing unit with a rotational speed sensor comprising:

a stationary ring having a peripheral surface formed with a first raceway and a first end portion, a rotatable ring having a peripheral surface formed with a second raceway, a plurality of rolling members rotatably provided between the first and second raceways, a cover fixed to the first end portion of the stationary ring, having an insert hole, and integrally formed with one of nut-like member and bolt-like member, an encoder fixed to the rotatable ring in a concentric relationship therewith and having circumferential characteristics changing alternately with a uniform interval, a sensor inserted into the insert hole of the cover to face the encoder and having an output changing corresponding to the rotation of the encoder, and a sensor holder provided for supporting the sensor and having an insert portion with an end, a mount flange portion with a tip end portion and a base end portion connected to the end of the insert portion, such that a through-hole is provided in the tip end portion of the mount flange portion, and that the insert portion with the sensor held therein is inserted into the insert hole of the cover, the sensor holder being connected to the cover by way of threaded engagement of the one of the bolt-like member and the nut-like member inserted into the through-hole wherein the mount flange portion of the sensor holder is fixed to the cover by way of the threaded engagement such that any foreign matter is prevented from entering the interior of the cover.

2. The rolling bearing unit with the rotational speed sensor of claim 1, wherein the cover is made from a metal plate and for-ed through a pressing process, and provided with a female threaded portion by way of thermal drill process and tapping process, such that the mount flange portion of the sensor holder is fix ed to the female threaded portion in a threaded engagement relationship.

3. The rolling bearing unit with the rotational speed sensor of claim 1, wherein the one of nut-like member and bolt-like member does not extend throughout the cover, and the sensor holder is fixedly connected to the one of nutlike member and the bolt-like member in a threaded engagement relationship.

4. The rolling bearing unit with the rotational speed sensor of claim 3, wherein the cover has a portion located in alignment with the through-hole in the sensor holder when the insert portion is inserted into the insert hole, the portion being provided with a bottomed concave portion, in which the nut for the nut-like member or the head of the bolt for the bolt-like member is fixed by way of welding or adhesion.

5. The rolling bearing unit with the rotational speed sensor of claim 3, wherein the cover is integrally formed with one of a nut-like member and a bolt-like member at a location in alignment with the through-hole in the sensor holder when the insert portion is inserted to the insert hole.

6. The rolling bearing unit with the rotational speed sensor of claim 1, wherein the portion of the cover formed with the insert hole is made from a synthetic resin plate, the cover is formed with a second through-hole in parallel with the insert hole, the synthetic resin plate has one surface formed with a recess portion with an inner peripheral surface in a non-cylindrical shape, around the opening on one end side of the second through-hole, the bolt-like member has a bolt head and the nut-like member has a nut, and one of the bolt head and nut has an outer peripheral surface and is nested in the recess portion and prevented from being rotated based on engagement of the outer peripheral surface with the inner peripheral surface of the recess portion, and the sensor holder is fixed to the cover through threaded engagement with the one of the bolt-like member and nut-like member.

* * * * *